(12) United States Patent
Li et al.

(10) Patent No.: US 11,040,513 B2
(45) Date of Patent: Jun. 22, 2021

(54) COMPOSITE GYPSUM BOARD AND METHODS RELATED THERETO

(71) Applicant: United States Gypsum Company, Chicago, IL (US)

(72) Inventors: Alfred C. Li, Naperville, IL (US); Weixin D. Song, Vernon Hills, IL (US); Yijun Sang, Oak Park, IL (US); Gregg G. Diefenbacher, Mars, PA (US); Annamaria Vilinska, Chicago, IL (US); Brian J. Christ, Burlington, IA (US); Fredrick T. Jones, Grayslake, IL (US); Bradley W. Todd, Hainesville, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 258 days.

(21) Appl. No.: 15/186,212

(22) Filed: Jun. 17, 2016

(65) Prior Publication Data

US 2016/0375656 A1    Dec. 29, 2016

Related U.S. Application Data

(60) Provisional application No. 62/184,060, filed on Jun. 24, 2015, provisional application No. 62/290,361, filed on Feb. 2, 2016.

(51) Int. Cl.
  *C04B 28/14*   (2006.01)
  *B32B 7/02*    (2019.01)
  (Continued)

(52) U.S. Cl.
  CPC .............. *B32B 7/02* (2013.01); *B32B 13/02* (2013.01); *B32B 13/04* (2013.01); *B32B 13/08* (2013.01);
  (Continued)

(58) Field of Classification Search
  CPC ......... B32B 13/04; B32B 13/08; B32B 13/10; B32B 13/12; B32B 2250/04; B32B 2250/05; C04B 28/14
  (Continued)

(56) References Cited

U.S. PATENT DOCUMENTS

| | | | |
|---|---|---|---|
| 1,500,452 A | 7/1924 | Haggerty | |
| 1,702,729 A | 2/1929 | Hite | |

(Continued)

FOREIGN PATENT DOCUMENTS

| | | |
|---|---|---|
| AT | 406048 B | 1/2000 |
| AU | 486746 | 11/1975 |

(Continued)

OTHER PUBLICATIONS

Allen, "Computed Tomography of the Antikythera Mechanism," *Abstracts of 5th World Congress on Industrial Process Tomography*, Bergen, Norway, Abstract No. P04, p. 88 (Sep. 6, 2007).

(Continued)

*Primary Examiner* — Scott W Dodds
(74) *Attorney, Agent, or Firm* — Greer, Burns & Crain, Ltd.; Philip T. Petti; Pradip Sahu

(57) ABSTRACT

Disclosed is a composite gypsum board comprising a board core and a concentrated layer of substantial thickness (e.g., at least about 0.02 inches). The concentrated layer includes a higher weight percentage of an enhancing additive than the board core. The board core has a thickness greater than the thickness of the concentrated layer and forms the bulk of the board volume. The concentrated layer has a higher density (e.g., at least about 1.1 times greater) than the density of the board core. Also disclosed is a method of preparing a composite gypsum board.

23 Claims, 6 Drawing Sheets

(51) Int. Cl.

| | |
|---|---|
| *B32B 13/08* | (2006.01) |
| *B32B 13/14* | (2006.01) |
| *B32B 37/14* | (2006.01) |
| *B32B 13/02* | (2006.01) |
| *B32B 13/04* | (2006.01) |
| *C04B 11/00* | (2006.01) |
| *C04B 24/38* | (2006.01) |
| *E04C 2/04* | (2006.01) |
| *C04B 22/16* | (2006.01) |
| *C04B 111/00* | (2006.01) |
| *C04B 111/30* | (2006.01) |
| *B32B 37/15* | (2006.01) |

(52) U.S. Cl.
CPC ............ *B32B 13/14* (2013.01); *B32B 37/144* (2013.01); *C04B 11/00* (2013.01); *C04B 11/002* (2013.01); *C04B 22/16* (2013.01); *C04B 24/383* (2013.01); *C04B 28/14* (2013.01); *E04C 2/043* (2013.01); *B32B 37/15* (2013.01); *B32B 2250/04* (2013.01); *B32B 2250/40* (2013.01); *B32B 2260/028* (2013.01); *B32B 2260/046* (2013.01); *B32B 2262/101* (2013.01); *B32B 2264/02* (2013.01); *B32B 2264/0228* (2013.01); *B32B 2264/06* (2013.01); *B32B 2264/062* (2013.01); *B32B 2307/50* (2013.01); *B32B 2307/51* (2013.01); *B32B 2307/536* (2013.01); *B32B 2307/54* (2013.01); *B32B 2307/718* (2013.01); *B32B 2307/72* (2013.01); *B32B 2419/00* (2013.01); *B32B 2419/04* (2013.01); *B32B 2419/06* (2013.01); *B32B 2607/00* (2013.01); *C04B 2111/0062* (2013.01); *C04B 2111/00413* (2013.01); *C04B 2111/30* (2013.01); *C04B 2201/20* (2013.01)

(58) Field of Classification Search
USPC ........................................ 156/39, 42, 44–46
See application file for complete search history.

(56) References Cited

U.S. PATENT DOCUMENTS

| | | | |
|---|---|---|---|
| 2,017,022 | A | 10/1935 | Roos |
| 2,080,009 | A | 5/1937 | Roos |
| 2,346,999 | A | 6/1937 | Briscoe |
| 2,322,194 | A | 6/1943 | King |
| 2,336,251 | A | 12/1943 | Hoggatt |
| 2,803,575 | A | 8/1957 | Riddell et al. |
| 2,806,811 | A | 9/1957 | Von Hazmburg |
| 2,965,528 | A | 12/1960 | Loechl |
| 3,179,529 | A | 4/1965 | Hickey et al. |
| 3,260,027 | A | 7/1966 | Page et al. |
| 3,300,371 | A | 1/1967 | Hart |
| 3,359,146 | A | 12/1967 | Lane et al. |
| 3,382,636 | A | 5/1968 | Green |
| 3,513,009 | A | 5/1970 | Sauer et al. |
| 3,573,947 | A | 4/1971 | Kinkade et al. |
| 3,649,319 | A | 3/1972 | Smith |
| 3,674,726 | A | 7/1972 | Kirk |
| 3,692,620 | A | 9/1972 | Schmidt et al. |
| 3,908,062 | A | 9/1975 | Roberts |
| 3,926,650 | A | 12/1975 | Lange et al. |
| 3,944,698 | A | 3/1976 | Dierks et al. |
| 3,947,285 | A | 3/1976 | Jones et al. |
| 3,993,822 | A | 11/1976 | Knauf et al. |
| 4,009,062 | A | 2/1977 | Long |
| 4,051,291 | A | 9/1977 | Long |
| 4,054,461 | A | 10/1977 | Martin |
| 4,184,887 | A | 1/1980 | Lange et al. |
| 4,195,109 | A | 3/1980 | Long |
| 4,195,110 | A | 3/1980 | Dierks et al. |
| 4,233,368 | A | 11/1980 | Baehr et al. |
| 4,237,260 | A | 12/1980 | Lange et al. |
| 4,265,979 | A | 5/1981 | Baehr et al. |
| 4,292,364 | A | 11/1981 | Wesch et al. |
| 4,327,146 | A | 4/1982 | White |
| 4,392,896 | A | 7/1983 | Sakakibara |
| 4,455,271 | A | 6/1984 | Johnson |
| 4,518,652 | A | 5/1985 | Willoughby |
| 4,725,477 | A | 2/1988 | Kole et al. |
| 4,965,031 | A | 10/1990 | Conroy |
| 5,085,929 | A | 2/1992 | Bruce et al. |
| 5,116,671 | A | 5/1992 | Bruce et al. |
| 5,224,315 | A | 7/1993 | Winter et al. |
| 5,227,100 | A | 7/1993 | Koslowski et al. |
| 5,320,677 | A | 6/1994 | Baig |
| 5,373,674 | A | 12/1994 | Winter et al. |
| 5,397,631 | A | 3/1995 | Green et al. |
| 5,534,059 | A | 7/1996 | Immordino, Jr. |
| 5,565,252 | A | 10/1996 | Finestone |
| 5,575,844 | A | 11/1996 | Bradshaw |
| 5,580,637 | A | 12/1996 | Konta et al. |
| 5,595,595 | A | 1/1997 | Glenn |
| 5,643,510 | A | 7/1997 | Sucech |
| 5,683,635 | A | 11/1997 | Sucech et al. |
| 5,714,001 | A | 2/1998 | Savoly et al. |
| 5,714,032 | A | 2/1998 | Ainsley et al. |
| 5,788,857 | A | 8/1998 | Yang et al. |
| 5,876,563 | A | 3/1999 | Greenwood |
| 5,908,521 | A | 6/1999 | Ainsley et al. |
| 5,922,447 | A | 7/1999 | Baig |
| 5,962,119 | A | 10/1999 | Chan |
| 6,110,575 | A | 8/2000 | Haga |
| 6,171,388 | B1 | 1/2001 | Jobbins |
| 6,190,476 | B1 | 2/2001 | Seecharan et al. |
| 6,221,521 | B1 | 4/2001 | Lynn et al. |
| 6,340,388 | B1 | 1/2002 | Luongo |
| 6,342,284 | B1 | 1/2002 | Yu et al. |
| 6,387,172 | B1 | 5/2002 | Yu et al. |
| 6,391,958 | B1 | 5/2002 | Luongo |
| 6,398,864 | B1 | 6/2002 | Przybysz et al. |
| 6,403,688 | B1 | 6/2002 | Luongo |
| 6,406,537 | B1 | 6/2002 | Immordino |
| 6,409,819 | B1 | 6/2002 | Ko |
| 6,409,824 | B1 | 6/2002 | Veeramasuneni et al. |
| 6,409,825 | B1 | 6/2002 | Yu et al. |
| 6,443,258 | B1 | 9/2002 | Putt et al. |
| 6,475,313 | B1 | 11/2002 | Peterson et al. |
| 6,485,821 | B1 | 11/2002 | Bruce et al. |
| 6,489,040 | B1 | 12/2002 | Rohlf et al. |
| 6,494,609 | B1 | 12/2002 | Wittbold et al. |
| 6,524,679 | B2 | 2/2003 | Hauber et al. |
| 6,547,901 | B1 | 4/2003 | Gerlich et al. |
| 6,572,698 | B1 | 6/2003 | Ko |
| 6,599,621 | B2 | 7/2003 | Porter |
| 6,613,424 | B1 | 9/2003 | Putt et al. |
| 6,632,550 | B1 | 10/2003 | Yu et al. |
| 6,656,858 | B1 | 12/2003 | Cahill |
| 6,706,128 | B2 | 3/2004 | Sethuraman |
| 6,743,830 | B2 | 6/2004 | Soane et al. |
| 6,774,146 | B2 | 8/2004 | Savoly et al. |
| 6,780,356 | B1 | 8/2004 | Putt et al. |
| 6,800,131 | B2 | 10/2004 | Yu et al. |
| 6,808,793 | B2 | 10/2004 | Randall |
| 6,815,049 | B2 | 11/2004 | Veeramasuneni et al. |
| 6,822,033 | B2 | 11/2004 | Yu et al. |
| 6,831,118 | B2 | 12/2004 | Munzenberger |
| 6,832,652 | B1 | 12/2004 | Dillenbeck et al. |
| 6,838,163 | B2 | 1/2005 | Smith et al. |
| 6,841,232 | B2 | 1/2005 | Tagge et al. |
| 6,874,930 | B2 | 4/2005 | Wittbold et al. |
| 6,878,321 | B2 | 4/2005 | Hauber et al. |
| 6,941,720 | B2 | 9/2005 | DeFord et al. |
| 6,983,821 | B2 | 1/2006 | Putt et al. |
| 6,986,812 | B2 | 1/2006 | Dubey et al. |
| 7,007,914 | B2 | 3/2006 | Petersen et al. |
| 7,296,919 | B2 | 11/2007 | Petersen et al. |
| 7,364,676 | B2 | 4/2008 | Sucech et al. |
| 7,425,236 | B2 | 9/2008 | Yu et al. |
| 7,455,728 | B2 | 11/2008 | Losch et al. |

(56) References Cited

U.S. PATENT DOCUMENTS

| | | | |
|---|---|---|---|
| 7,661,511 B2 | 2/2010 | Hasegawa | |
| 7,799,410 B2 | 9/2010 | Tinianov | |
| 7,811,413 B2 | 10/2010 | Hennis et al. | |
| 7,851,057 B2 | 12/2010 | Englert et al. | |
| RE44,070 E * | 3/2013 | Yu | C04B 28/14 |
| | | | 428/156 |
| 8,702,881 B2 | 4/2014 | Yu et al. | |
| 2001/0001218 A1 | 5/2001 | Luongo | |
| 2002/0017222 A1 | 2/2002 | Luongo | |
| 2002/0045074 A1 | 4/2002 | Yu et al. | |
| 2002/0112651 A1 | 8/2002 | Yu et al. | |
| 2002/0139082 A1 | 10/2002 | DeFord et al. | |
| 2003/0019176 A1 | 1/2003 | Anderson | |
| 2003/0084633 A1* | 5/2003 | Zuber | B32B 13/08 |
| | | | 52/416 |
| 2003/0084980 A1 | 5/2003 | Seufert et al. | |
| 2003/0089061 A1 | 5/2003 | DeFord et al. | |
| 2003/0092784 A1 | 5/2003 | Tagge et al. | |
| 2004/0005484 A1 | 1/2004 | Veeramasuneni et al. | |
| 2004/0026002 A1 | 2/2004 | Weldon et al. | |
| 2004/0038065 A1 | 2/2004 | Francis | |
| 2004/0045481 A1 | 3/2004 | Sethuraman et al. | |
| 2004/0092625 A1 | 5/2004 | Pollock et al. | |
| 2004/0131714 A1 | 7/2004 | Burke | |
| 2004/0134585 A1 | 7/2004 | Callais et al. | |
| 2004/0152379 A1 | 8/2004 | McLarty et al. | |
| 2004/0231916 A1 | 11/2004 | Englert et al. | |
| 2005/0019618 A1 | 1/2005 | Yu et al. | |
| 2005/0061237 A1 | 3/2005 | Dubey et al. | |
| 2005/0064164 A1 | 3/2005 | Dubey et al. | |
| 2005/0067082 A1 | 3/2005 | Mowry | |
| 2005/0121131 A1 | 6/2005 | Hennis et al. | |
| 2005/0142347 A1 | 6/2005 | Takahara et al. | |
| 2005/0181693 A1 | 8/2005 | Kajander | |
| 2005/0219938 A1 | 10/2005 | Rigaudon et al. | |
| 2005/0223949 A1 | 10/2005 | Bailey et al. | |
| 2005/0263925 A1 | 12/2005 | Heseltine et al. | |
| 2006/0196391 A1 | 9/2006 | Hassan et al. | |
| 2006/0243171 A1 | 11/2006 | Yu et al. | |
| 2006/0244183 A1 | 11/2006 | Wittbold et al. | |
| 2006/0278132 A1 | 12/2006 | Yu et al. | |
| 2006/0278133 A1 | 12/2006 | Yu et al. | |
| 2006/0278135 A1 | 12/2006 | Liu et al. | |
| 2007/0032393 A1 | 2/2007 | Patel et al. | |
| 2007/0048490 A1 | 3/2007 | Yu et al. | |
| 2007/0059513 A1 | 3/2007 | Yu et al. | |
| 2007/0082170 A1 | 4/2007 | Colbert et al. | |
| 2007/0102237 A1 | 5/2007 | Baig | |
| 2007/0141304 A1 | 6/2007 | Agrawal | |
| 2008/0057318 A1 | 3/2008 | Adzima et al. | |
| 2008/0070026 A1 | 3/2008 | Yu et al. | |
| 2008/0087366 A1 | 4/2008 | Yu et al. | |
| 2008/0090068 A1 | 4/2008 | Yu | |
| 2008/0190062 A1 | 8/2008 | Engbrecht et al. | |
| 2008/0251198 A1 | 10/2008 | Tinianov | |
| 2008/0257222 A1 | 10/2008 | Wallner | |
| 2009/0011212 A1 | 1/2009 | Dubey et al. | |
| 2009/0029141 A1 | 1/2009 | Shake et al. | |
| 2009/0126300 A1 | 5/2009 | Fujiwara et al. | |
| 2009/0208714 A1 | 8/2009 | Currier et al. | |
| 2010/0143682 A1* | 6/2010 | Shake | B32B 13/14 |
| | | | 428/218 |
| 2010/0197182 A1 | 8/2010 | Barzilai | |
| 2010/0222457 A1 | 9/2010 | Wallner | |
| 2010/0247937 A1 | 9/2010 | Liu et al. | |
| 2011/0024028 A1 | 2/2011 | Immordino et al. | |
| 2011/0046898 A1 | 2/2011 | Li et al. | |
| 2011/0054053 A1 | 3/2011 | Lee et al. | |
| 2011/0195241 A1 | 8/2011 | Yu et al. | |
| 2011/0210164 A1 | 9/2011 | Babinsky et al. | |
| 2012/0168527 A1 | 7/2012 | Li et al. | |
| 2012/0170403 A1 | 7/2012 | Li et al. | |
| 2012/0207989 A1 | 8/2012 | Xu et al. | |
| 2013/0098268 A1 | 4/2013 | Li et al. | |
| 2013/0099027 A1 | 4/2013 | Li et al. | |
| 2013/0099418 A1 | 4/2013 | Li et al. | |
| 2013/0100759 A1 | 4/2013 | Wittbold et al. | |
| 2013/0216717 A1 | 8/2013 | Rago et al. | |
| 2013/0216762 A1 | 8/2013 | Chan et al. | |
| 2013/0233880 A1 | 9/2013 | Rago et al. | |
| 2013/0308411 A1 | 11/2013 | Wittbold et al. | |
| 2014/0073711 A1 | 3/2014 | Lee et al. | |
| 2014/0113124 A1 | 4/2014 | Sang et al. | |
| 2014/0322395 A1 | 10/2014 | Thompson | |
| 2014/0335365 A1 | 11/2014 | Wada et al. | |
| 2015/0010767 A1 | 1/2015 | Sang et al. | |
| 2015/0114264 A1 | 4/2015 | Taboulot et al. | |
| 2015/0266270 A1 | 9/2015 | Yu et al. | |
| 2015/0315076 A1* | 11/2015 | Li | C04B 28/02 |
| | | | 524/2 |

FOREIGN PATENT DOCUMENTS

| | | |
|---|---|---|
| CN | 1238312 A | 12/1999 |
| CN | 1396138 A | 2/2003 |
| CN | 104453150 A | 3/2015 |
| DE | 3238093 A1 | 4/1984 |
| DE | 4316518 A1 | 11/1994 |
| EP | 0335405 A2 | 10/1989 |
| EP | 1008568 A1 | 6/2000 |
| FR | 2673620 A1 | 9/1992 |
| GB | 1028890 A | 5/1966 |
| GB | 1170444 A | 11/1969 |
| GB | 1250713 A | 10/1971 |
| GB | 1381457 A | 1/1975 |
| GB | 1561232 A | 2/1980 |
| GB | 2053779 A | 2/1981 |
| JP | H05-148001 A | 6/1993 |
| JP | 2009-270380 A | 11/2009 |
| KR | 1020060123582 A | 12/2006 |
| NO | 126524 B | 2/1973 |
| WO | WO 1996/026166 A1 | 8/1996 |
| WO | WO 1999/016984 A1 | 4/1999 |
| WO | WO 2000/049246 A1 | 8/2000 |
| WO | WO 2001/045932 A1 | 6/2001 |
| WO | WO 2001/081263 A1 | 11/2001 |
| WO | WO 2003/000620 A1 | 1/2003 |
| WO | WO 2005/106156 A1 | 11/2005 |
| WO | WO 2009/007971 A1 | 1/2009 |
| WO | 2014/066079 A2 | 5/2014 |
| WO | WO 2014/066207 A1 | 5/2014 |
| WO | WO 2014/066283 A1 | 5/2014 |
| WO | WO 2015/185143 A1 | 12/2015 |

OTHER PUBLICATIONS

Alme et al., "3D Reconstruction of 10000 Particle Trajectories in Real-time" *Abstracts of 5th World Congress on Industrial Process Tomography*, Bergen, Norway, Abstract No. VIA05, p. 91 (Sep. 6, 2007).

AZom.com, AZO Materials Particle Size—US Sieve Series and Tyler Mesh Size Equivalents, obtained from the internet at http://www.azom.com/Details.asp?ArticleID=1417 on Jan. 21, 2011; Date added: May 15, 2002.

Banasiak et al., "Application of Charge Simulation Method (CSM) for ECT Imaging in Forward Problem and Sensitivity Matrix Calculation" *Abstracts of 5th World Congress on Industrial Process Tomography*, Bergen, Norway, Abstract No. VIA02, p. 89 (Sep. 6, 2007).

Bickford, "Designing for abuse resistance," pp. 11-14; USG Corporation, Chicago, Illinois (1995).

Burrows, "A Decade's Experience of Gypsum Board Weight Reduction in the U.S.", 14. Internationale Baustofftagung 1.0197-1.0207 (Weimar, Sep. 20-23, 2000).

Deffenbaugh et al. "Comparison of Starch Pasting Properties in the Brabender Viscoamylograph and the Rapid Visco-Analyzer," *Cereal Chemistry*, vol. 66, No. 6, pp. 493-499 (1989).

Diloflo® GW Products Bulletin, "Polynaphthalene Sulfonate, Sodium Salt", GEO Specialty Chemicals, Horsham, PA (Nov. 1999).

Global Gypsum Magazine, "Gypsum Process Engineering Industrial and Thermal Equipment" 7 pages (Nov. 2012).

(56) References Cited

OTHER PUBLICATIONS

Hyonic PFM33 Products Bulletin, "Zero VOC Foaming Agent for Gypsum Wallboard", GEO Specialty Chemicals, Horsham, PA (Jul. 2000).

Janaszewski et al., "Adaptive 3D Algorithm to Detect Bridging Ligaments during Intergranular Stress Corrosion Cracking of Stainless Steel," *Abstracts of 5th World Congress on Industrial Process Tomography*, Bergen, Norway, Abstract No. VIA03, p. 90 (Sep. 6, 2007).

Li et al., "Updating Sensitivity Maps in Landweber Iteration for Electrical Capacitance Tomography" *Abstracts of 5th World Congress on Industrial Process Tomography*, Bergen, Norway, Abstract No. VIA04, p. 90 (Sep. 6, 2007).

Lin et al., "Characterization and Analysis of Porous, Brittle Solid Structures by Micro CT," *Abstracts of 5th World Congress on Industrial Process Tomography*, Bergen, Norway, Paper No. VIA07, p. 92 (Sep. 6, 2007).

Maad et al., "Comparing Analysis of Image Visualisation Accuracy of Electrical Capacitance Tomography and Gamma Tomography" *Abstracts of 5th World Congress on Industrial Process Tomography*, Bergen, Norway, Abstract No. VIA01, p. 89 (Sep. 6, 2007).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

Ship et al., "Thermophysical Characterization of Type X Special Fire Resistant Gypsum Board", Proceedings of the Fire and Materials 2011 Conference, San Francisco, Jan. 31-Feb. 2, 2011, Interscience Communications Ltr., London, UK, p. 417-426.

"Standard Test Methods for Physical Testing of Gypsum Panel Products", Annual Book of ASTM Standards, Designations: C 473-97, vol. 04:01 pp. 253-263 (1998).

Videla et al., "Watershed Functions Applied to a 3D Segmentation Problem for the Analysis of Packed Particle Beds," *Part. Part. Syst. Charact.* 23: 237-245 (2006).

Wirsching et al., "Calcium Sulfate" Ullmann's Encyclopedia of Industrial Chemistry, 5th Edition, vol. A4, pp. 1, 15 (Dec. 20, 1985).

Xiong et al., "Wavelet Enhanced Visualisation and Solids Distribution in the Top of Circulating Fluidized Beds" *Abstracts of 5th World Congress on Industrial Process Tomography*, Bergen, Norway, Abstract No. VIA06, p. 91 (Sep. 6, 2007).

European Patent Office, International Search Report and the Written Opinion in International Application No. PCT/US2016/038737 (dated Sep. 21, 2016).

Celanese, "Complete Textile Glossary," Celanese Acetate, LLC, p. 62 (2001).

Marshall Additive Technologies, "KAYOCELS® Cellulose and Cellulose Compounds," obtained from http://www.rjmarshall.com/wp-content/uploads/2013/08/White-Kayocels-TDS.pdf Feb. 2013).

European Patent Office, International Search Report and the Written Opinion in International Application No. PCT/US2017/050587 (dated Dec. 20, 2017).

Notice of Reasons for Rejection Received in JP 2017-566400 dated Jun. 2, 2020 (English Summary).

Non-Final Office Action received in U.S Appl. No. 15/186,257 dated Mar. 11, 2021.

\* cited by examiner

COMPOSITE GYPSUM BOARD AND METHODS RELATED THERETO

CROSS-REFERENCE TO RELATED APPLICATIONS

This patent application claims the benefit of U.S. Provisional Patent Application No. 62/184,060, filed Jun. 24, 2015, and 62/290,361, filed Feb. 2, 2016, which are incorporated by reference.

BACKGROUND

Set gypsum (i.e., calcium sulfate dihydrate) is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

The excess water that is driven off represents inefficiency in the system. Energy input is required to remove the water, and the manufacturing process is slowed to accommodate the drying step. However, reducing the amount of water in the system has proven to be very difficult without compromising other critical aspects of gypsum board, e.g., commercial gypsum board product, including board weight and strength.

Another challenge is reducing the weight of gypsum board while maintaining strength. One measure of the strength of board is "nail pull resistance," sometimes simply referred to as "nail pull." To reduce the weight of the board, foaming agent can be introduced into the slurry to form air voids in the final product. Replacing solid mass with air in the gypsum board envelope reduces weight, but that loss of solid mass can also result in less strength. Compensating for loss in strength is a significant obstacle in weight reduction efforts in the art.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY

In one aspect, the disclosure provides a composite gypsum board. The composite board comprises a board core comprising set gypsum formed from at least water, stucco, and optionally, an enhancing additive. The board core defines first and second core faces in opposing relation and a concentrated layer. The concentrated layer is disposed in bonding relation to the first core face. The concentrated layer is formed from the enhancing additive, water, and, e.g., a cementitious material, such as stucco, to form a hydrated cementitious material such as set gypsum in a continuous crystalline matrix. The enhancing additive is preferably more concentrated (by weight percentage) in the concentrated layer than in the board core. As used herein, any reference to the enhancing additive being "more concentrated" (or variants of the term) in the slurry for forming the concentrated layer than in the slurry for forming board core includes the situations where (a) both the concentrated layer and the board core are formed from enhancing additive, and (b) the concentrated layer is formed from the enhancing additive but the board core contains zero, or no, enhancing additive.

The concentrated layer has a density of at least about 1.1 times higher than a density of the board core and has a thickness of from about 0.02 inches (about 0.05 cm) to about 0.2 inches (about 0.5 cm) in some embodiments. The board core preferably has a thickness greater than the thickness of the concentrated layer. The enhancing additive includes a strength-imparting additive as described herein that helps produce desired strength properties as described herein.

Board formed from a concentrated layer slurry containing higher weight percentage of the enhancing additive than contained in the board core slurry allows for one or more efficiencies or process benefits. For example, the overall use of enhancing additive in the board can be reduced by focusing the enhancing additive in forming a smaller weight section of smaller thickness (i.e., the concentrated layer) and using less or no enhancing additive in forming a larger weight section of larger thickness (i.e., the board core). Surprisingly and unexpectedly, the concentrated layer, formed from a higher weight percentage of the enhancing additive, is able to distribute the desired resulting properties throughout the board core, such that the board exhibits the strength properties. As a result, the board core can be made with less overall enhancing additive, and in some embodiments can be lighter and less dense than conventional board cores. In turn, overall board weight can be reduced as the density in a large weight section of the board (i.e., the core) is reduced.

In the case of some enhancing additives, such as certain pregelatinized starches, they can require water in a slurry, i.e., they increase water demand. By reducing the amount of the enhancing additive in the slurry for forming the board core, the water demand in the slurry for forming the core can be reduced in some embodiments. Thus, for example, overall water usage in preparing the board can be reduced, which further can improve efficiencies as less water is used in the system such that less water is required to be driven off by heating in the kiln. As a result, manufacturing line speed can be improved and drying costs can be reduced.

The composite gypsum board can be within a range of desired densities. In some embodiments, the board can be made at ultra-light weights, such as at a board density of about 33 pcf or less. It will be understood that board weight is a function of density and thickness. Thus, density can be used as a measure of board weight as will be understood in the art. Such ultra-light weights can be achieved without compromising desired strength properties. For example, in some embodiments, the composite gypsum board can exhibit a nail pull resistance of at least about 65 lbs of force (e.g., at least about 72 lbs of force, at least about 77 lbs of force, etc.) according to ASTM C473-10, Method B.

In another aspect, the disclosure provides a method of making composite gypsum board. The method comprises preparing a concentrated layer slurry comprising water and the enhancing additive. The concentrated layer slurry can also include a base material to impart, e.g., a primary source of mass and density, such as a cementitious material, e.g., stucco that can hydrate to form an interlocking matrix of set gypsum. The concentrated layer slurry is applied in a bonding relation to a first cover sheet to form a concentrated layer having a first face and a second face. The first face of the concentrated layer faces the first cover sheet. The method also comprises mixing at least water, stucco, and optionally the enhancing additive, to form a board core slurry. The board core slurry is applied in a bonding relation to the concentrated layer to form a board core. The board core has a first face and a second face, wherein the first board core face faces the concentrated layer second face. A second cover sheet is applied in bonding relation to the second board core face to form a board precursor. The board precursor is dried to form the board. When the board core slurry contains enhancing additive, the concentrated layer slurry contains a higher weight percentage of the enhancing slurry than the board core slurry. In some embodiments, the concentrated layer has a thickness of from about 0.02 inches (about 0.05 cm) to about 0.2 inches (about 0.5 cm). When dried, the board core has a thickness greater than the thickness of the concentrated layer.

In another aspect, the disclosure provides another method of making composite gypsum board. The method comprises preparing a concentrated layer slurry comprising water and the enhancing additive. The concentrated layer slurry can also include a base material to impart, e.g., a primary source of mass and density, such as a cementitious material, e.g., stucco that can hydrate to form an interlocking matrix of set gypsum. The concentrated layer slurry is applied in a bonding relation to a first cover sheet to form a concentrated layer having a first face and a second face. The first face of the concentrated layer faces the first cover sheet. The method also comprises mixing at least water, stucco, and optionally the enhancing additive, to form a board core slurry. The board core slurry is applied in a bonding relation to the concentrated layer to form a board core. The board core has a first face and a second face, wherein the first board core face faces the concentrated layer second face. A second cover sheet is applied in bonding relation to the second board core face to form a board precursor. The board precursor is dried to form the board. When the board core slurry contains enhancing additive, the concentrated layer slurry contains a higher weight percentage of the enhancing slurry than the board core slurry. When dried, the board core has a thickness greater than the thickness of the concentrated layer.

Processes according to the disclosure can be used to produce composite board at any suitable density. In some embodiments, the board can be made at ultra-light weights, such as at a board density of about 33 pcf (about 530 kg/m$^3$) or less. Such ultra-light weights can be achieved without compromising desired strength properties. For example, in some embodiments, the composite gypsum board can exhibit a nail pull resistance of at least about 65 lbs of force (e.g., at least about 72 lbs of force, at least about 77 lbs of force, etc.) according to ASTM C473-10, Method B. Other aspects and embodiments will be apparent from the full description herein.

DETAILED DESCRIPTION

Figure 1:
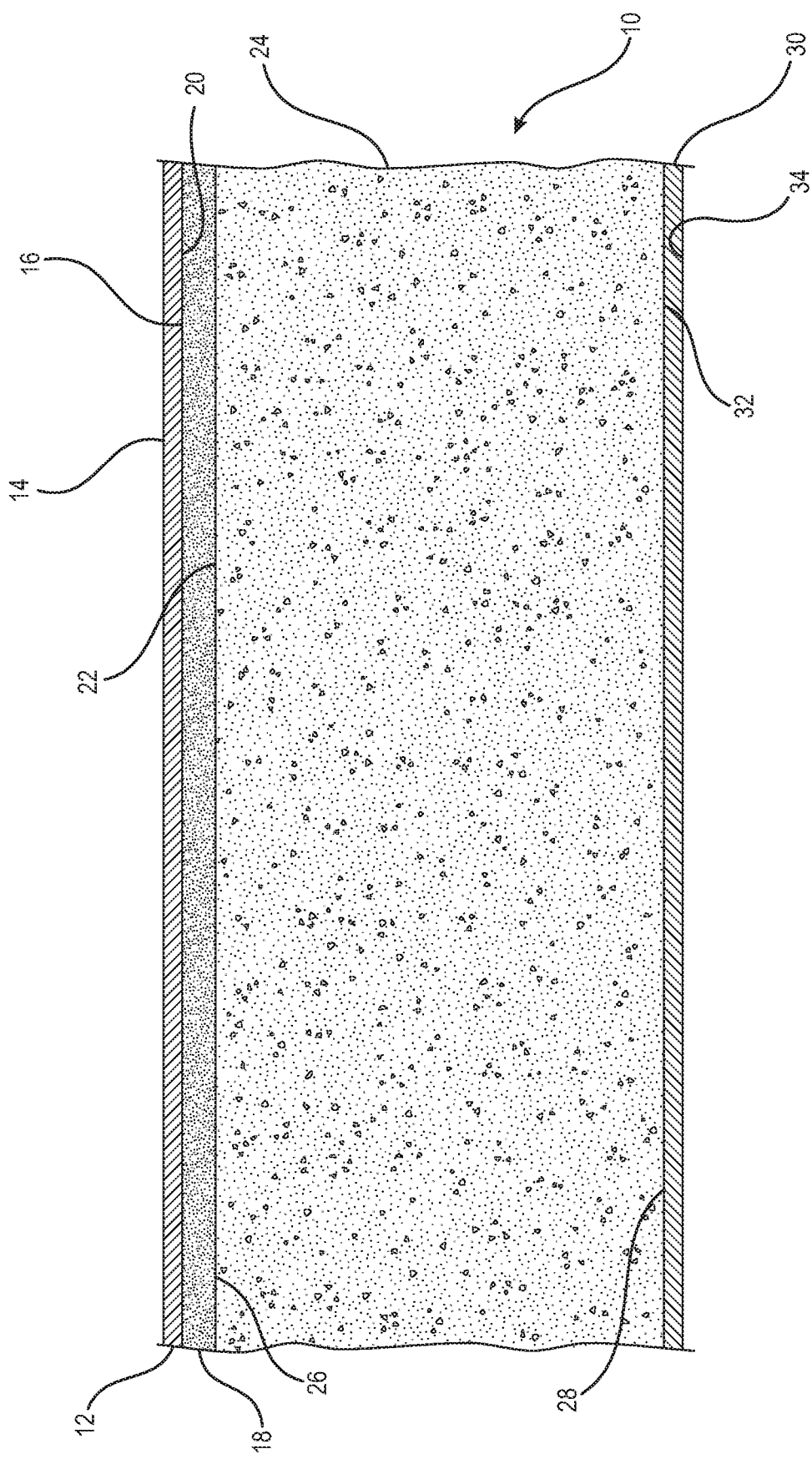
FIG. 1 is a schematic sectional view of a composite gypsum board constructed in accordance with principles of the present disclosure.

Embodiments of the disclosure provide a novel construction for a composite board (e.g., gypsum board, such as wallboard) and a method of making such board. As used herein, gypsum wallboard (often referred to as drywall), can encompass such board used not only for walls but also for ceilings and other locations as understood in the art. In one aspect, the composite board contains multiple layers which contain different cementitious compositions, e.g., in the form of a continuous crystalline matrix of set gypsum in the final product. One layer forms the board core and another layer forms a concentrated layer of substantial thickness (e.g., at least about 0.02 inches, or about 0.05 cm). The board core is generally thicker than the concentrated layer in preferred embodiments and makes up the bulk (e.g., over about 60%, such as over about 70%, over about 75%, etc) of the volume of the board's envelope. Typically, the board also includes top (face) and bottom (back) cover sheets.

The board core and the concentrated layer are both formed from cementitious material and water. In accordance with preferred embodiments of the disclosure, the concentrated layer is formulated to have a higher density than the board core has (e.g., at least about 1.1 times higher). To formulate a lower density board core, foaming agents as known in the art can be used in the board core, although other materials for reducing density can be included in the slurry for forming the board core, as an alternative or additional ingredient, such as lightweight filler including, for example, lightweight aggregate or perlite, particularly if the additional expense can be accepted. The concentrated layer can include less or no foaming agent and/or less or no lightweight filler in order to achieve the desired higher density in that layer.

While not wishing to be bound by any particular theory, it is believed that the compositions of, and inter-relationships between, the respective layers in the composite board impart surprising and unexpected properties in the product. In particular, it is believed that the targeted use of enhancing additive in the concentrated layer can be used to impart desired board properties, and enhance process efficiencies as desired. In addition, in some embodiments, aspects such as (a) the thickness, density, and/or strength of the concentrated layer, and/or (b) the properties of the concentrated layer relative to the paper and the board core, respectively, can be used to optimize board properties as desired. Based at least in part on these aspects, it is believed that desired properties from the concentrated layer can be distributed and directed throughout the board, to thereby facilitate production of a composite board while maintaining physical properties into the board core as desired.

In accordance with some embodiments, the dry concentrated layer has a stiffness value that is closer to a stiffness value of the top cover sheet to which it is generally adjacent. The concentrated layer has a higher stiffness value than the board core in some embodiments. Thus, the concentrated layer can be disposed between a material with relatively good stiffness and strength (i.e., the top cover sheet) and a material with less stiffness and strength (i.e., the board core) in some embodiments. It will be understood that stiffness value can be measured according to Young's modulus as known in the art.

While not wishing to be bound by any particular theory, it is believed that including a higher weight percentage of enhancing additive, which imparts desired strength properties, in the concentrated layer results in effective desired strength properties. The concentrated layer is disposed between a top cover sheet and a preferably lighter and weaker board core. Surprisingly and unexpectedly, the concentrated layer serves to absorb energy from a load and more uniformly distribute the load into the board core and throughout the board such that the load desirably will more readily attenuate and dissipate. As such, the inventive composite gypsum board will demonstrate good strength properties and allow for lower weight board to be produced by targeting enhanced strength in the concentrated layer where the property can be distributed into the board core. For example, this advantage can be illustrated via good results on a nail pull resistance and flexural strength tests in some embodiments, as is understood in the art in accordance with ASTM 473-10, Method B.

Composition of Board Core and Concentrated Layer

In accordance with some embodiments of the disclosure, the composite gypsum board is tailored to include an enhancing additive in a higher concentration than the enhancing additive is included (if at all) in the board core. The resulting board can be formed to achieve a composite gypsum board with desired strength properties.

In accordance with some embodiments, it has been surprisingly and unexpectedly found that the higher concentration of the enhancing additive in the concentrated layer relative to the board core results in efficient board performance with respect to desired strength properties, e.g., nail pull resistance, compressive strength, flexural strength, etc. As such, the present inventors have found that the usage of the enhancing additives can be optimized in accordance with preferred embodiments by tailoring the formulations of the compositions of the respective board core and concentrated layers to include enhancing additives where their effect can provide more of an impact to achieve desired strength properties (i.e., in a higher weight percentage in the concentrated layer than in the board core), and a lower overall water demand. This discovery imparts a considerable advantage including, but not limited to, reducing overall enhancing additive usage and, hence, cost of the raw material, enhancing manufacturing efficiency, and enhancing product strength, e.g., allowing for lower weight product with sufficient strength properties.

In some embodiments, the slurry for forming the concentrated layer contains at least about 1.2 times the concentration of the enhancing additive as compared with the slurry for forming board core, such as, for example, at least about 1.5 times, at least about 1.7 times, at least about 2 times, at least about 2.5 times, at least about 3 times, at least about 3.5 times, at least about 4 times, at least about 4.5 times, at least about 5 times, at least about 6 times, etc., wherein each of these ranges can have any suitable upper limit as appropriate, such as, for example, about 60, about 50, about 40, about 30, about 20, about 10, about 9, about 8, about 7, about 6.5, about 6, about 5.5, about 5, about 4.5, about 4, about 3.5, about 3, about 2.5, about 2, about 1.5, etc. It will be understood that "higher concentration," as used herein, refers to relative amounts of an enhancing additive (by weight of the stucco), as opposed to gross amounts of ingredients. Since the board core provides a higher bulk volume and thickness contribution to the board, as compared with such contribution by the concentrated layer, it is possible that any particular additive may be provided in a higher total gross amount in the board core slurry, e.g., in pounds or kilograms, yet be provided in a lower weight concentration as compared with the slurry for the concentrated layer, i.e., in a lower relative amount, e.g., in weight percentage (wt. %).

Surprisingly and unexpectedly, some embodiments of the disclosure are effective in reducing the overall water usage in making the composite gypsum board. In this regard, by tailoring the respective compositions of the concentrated layer and the board core, the total amount of water used to make the board can be reduced such that water usage is optimized since the water is present in a higher concentration where it is needed more (e.g., in the concentrated layer) and reduced where it is needed less (e.g., in the board core).

It will be understood that, since set gypsum is formed from a stucco slurry (sometimes called a gypsum slurry) containing water and stucco, a water-to-stucco ratio ("WSR") can be observed. In some embodiments, the board core, which can form the bulk of the board volume, can be formed from a lower WSR as compared with the WSR used to form the concentrated layer. Thus, the overall water usage and WSR in the composite gypsum board as a whole can advantageously be brought down in some embodiments since the contribution to the overall board volume by the concentrated layer is less than the contribution to the overall board volume by the board core.

The board core and concentrated layer can be formed from any suitable WSR. In some embodiments, the concentrated layer is formed from slurry having a WSR that is higher than the WSR of the slurry used to form the board core. For example, in some embodiments, the concentrated layer is formed from a slurry having a WSR that is at least about 1.2 times higher than the WSR of the slurry used to form the board core (e.g., at least about 1.5 times higher, at least about 1.7 times higher, at least about 2 times higher, at least about 2.2 times higher, at least about 2.5 times higher, at least about 2.7 times higher, at least about 3 times higher, at least about 3.2 times higher, at least about 3.5 times higher, at least about 3.7 times higher, at least about 4 times higher etc., wherein each of these ranges can have any suitable upper limit as appropriate, such as, for example, about 7, about 6.5, about 6, about 5.5, about 5, about 4.5, about 4, about 3.5, about 3, about 2.5, about 2, about 1.5, etc.)

In some embodiments, the board core is formed from stucco slurry having a water-stucco ratio from about 0.3 to about 1.3, e.g., from about 0.3 to about 1.2, from about 0.3 to about 1.2, from about 0.3 to about 1.2, from about 0.3 to about 1.2, from about 0.3 to about 1.1, from about 0.3 to about 1, from about 0.3 to about 0.9, from about 0.4 to about 1.3, from about 0.4 to about 1.2, from about 0.4 to about 1.1, from about 0.4 to about 1, from about 0.4 to about 0.9, from about 0.5 to about 1.3, from about 0.5 to about 1.2, from about 0.5 to about 1.1, from about 0.5 to about 1, from about 0.5 to about 0.9, from about 0.6 to about 1.3, from about 0.6 to about 1.2, from about 0.6 to about 1.1, from about 0.6 to about 1, from about 0.6 to about 0.9, from about 0.6 to about 0.8, or from about 0.6 to about 0.7.

In some embodiments, lower water-stucco ratios are preferred, e.g., from about 0.3 to about 0.8, such as, for example, from about 0.3 to about 0.7, from about 0.3 to about 0.6, from about 0.3 to about 0.5, from about 0.3 to about 0.4, from about 0.4 to about 0.8, from about 0.4 to about 0.7, from about 0.4 to about 0.6, from about 0.4 to about 0.5, from about 0.5 to about 0.8, from about 0.5 to about 0.7, from about 0.5 to about 0.6, from about 0.6 to about 0.8, from about 0.6 to about 0.7, etc.

In some embodiments, the concentrated layer is formed from a slurry having a water-stucco ratio from about 0.7 to about 2, such as, for example, from about 0.7 to about 1.7, from about 0.7 to about 1.4, from about 0.7 to about 1.2, from about 0.7 to about 1, from about 0.8 to about 2, from about 0.8 to about 1.7, from about 0.8 to about 1.4, from about 0.8 to about 1.2, from about 0.8 to about 1, from about 1 to about 2, from about 1 to about 1.7, from about 1 to about 1.4, from about 1 to about 1.2, from about 1.2 to about 2, from about 1.2 to about 1.7, from about 1.2 to about 1.4, from about 1.4 to about 2, from about 1.4 to about 1.7, etc. The concentrated layer can have a higher water content to satisfy the water demand of enhancing additives. Since the enhancing additive content is more concentrated in the concentrated layer in some embodiments, the higher water demand can be more isolated to the concentrated layer, thereby allowing for a lower WSR in the board core, and, advantageously, a lower water usage overall, particularly in view of the board core's large contribution to the volume bulk of the composite board.

Composite Board Density

The composite gypsum board according to embodiments of the disclosure has utility in a variety of desired densities for gypsum board, i.e., drywall or wallboard (which can encompass such board used not only for walls but also for ceilings and other locations as understood in the art). As noted herein, board weight is a function of thickness. Since boards are commonly made at varying thicknesses (e.g., ⅜ inch, ½ inch, ¾ inch, one inch, etc.), board density is used herein as a measure of board weight. The advantages of the composite gypsum board in accordance with embodiments of the disclosure can be seen at a range of dry densities, including up to heavier board densities, e.g., about 43 pcf (about 690 kg/m$^3$) or less, such as from about 18 pcf (about 290 kg/m$^3$) to about 43 pcf, from about 20 pcf (about 320 kg/m$^3$) to about 43 pcf, from about 20 pcf to about 40 pcf (about 640 kg/m$^3$), from about 24 pcf (about 380 kg/m$^3$) to about 43 pcf, from about 27 pcf (about 430 kg/m$^3$) to about 43 pcf, from about 20 pcf to about 38 pcf (about 610 kg/m$^3$), from about 24 pcf to about 40 pcf, from about 27 pcf to about 40 pcf, from about 20 pcf to about 37 pcf (about 600 kg/m$^3$), from about 24 pcf to about 37 pcf, from about 27 pcf to about 37 pcf, from about 20 pcf to about 35 pcf (about 560 kg/m$^3$), from about 24 pcf to about 35 pcf, from about 27 pcf to about 35 pcf, etc.

As noted herein, removing solid mass from gypsum wallboard can lead to considerable difficulty in compensating for the concomitant loss in strength. Some embodiments of the disclosure surprisingly and unexpectedly enable the use of lower weight board with good strength, lower water demand, and efficient use of enhancing additive. For example, in some embodiments, dry board density can be from about 16 pcf to about 33 pcf, e.g., from about 16 pcf to about 27 pcf, from about 16 pcf to about 24 pcf, from about 18 pcf to about 33 pcf (about 530 kg/m$^3$), from about 18 pcf to about 31 pcf, from about 18 pcf to about 30 pcf, from about 18 pcf to about 27 pcf, from about 18 pcf to about 24 pcf, from about 20 pcf to about 33 pcf, from about 20 pcf to about 32 pcf (about 510 kg/m$^3$), from about 20 pcf to about 31 pcf (about 500 kg/m$^3$), from about 20 pcf to about 30 pcf (about 480 kg/m$^3$), from about 20 pcf to about 30 pcf, from about 20 pcf to about 29 pcf (about 460 kg/m$^3$), from about 20 pcf to about 28 pcf (about 450 kg/m$^3$), from about 21 pcf (about 340 kg/m$^3$) to about 33 pcf, from about 21 pcf to about 32 pcf, from about 21 pcf to about 33 pcf, from about 21 pcf to about 32 pcf, from about 21 pcf to about 31 pcf, from about 21 pcf to about 30 pcf, from about 21 pcf to about 29 pcf, from about 21 pcf to about 28 pcf, from about 21 pcf to about 29 pcf, from about 24 pcf to about 33 pcf, from about 24 pcf to about 32 pcf, from about 24 pcf to about 31 pcf, from about 24 pcf to about 30 pcf, from about 24 pcf to about 29 pcf, from about 24 pcf to about 28 pcf, or from about 24 pcf to about 27 pcf.

Composite Board Structure and Assembly

To illustrate an embodiment of the disclosure, reference is made to FIG. 1, which shows a schematic cross-sectional view of a composite gypsum board 10. A face paper 12 serves as a top cover sheet. The face paper 12 has a first face 14 and a second face 16. A concentrated layer 18 is in bonding relation to face paper 12. The concentrated layer 18 has a first face 20 and a second face 22. A board core 24 has a first face 26 and a second face 28. A back paper 30 serves as a bottom cover sheet. The back paper 30 has a first face 32 and a second face 34.

As seen in FIG. 1, the composite gypsum board 10 is arranged such that face 16 of the face paper 12 faces the first face 20 of the concentrated layer 18 and the second face 22 of the concentrated layer 18 faces the first face 26 of the core 24. The second face 28 of the core 24 faces the first face 32 of the back paper 30.

It will be understood that composite gypsum board in accordance with some embodiments can be constructed and used in an assembly as will be understood in the art. Generally, as will be understood, the composite boards can be affixed in any suitable arrangement to studs formed of any suitable material such as wood, metal or the like. The top or face cover sheet of the board faces out and is generally decorated (e.g., with paint, texture, wallpaper, etc.) in use while the bottom or back cover sheet faces the studs. A cavity is normally present behind the stud, facing the back paper, in use. If desired, insulation material as known in the art optionally can be placed in the cavity. In one embodiment, the assembly comprises two composite boards connected by studs with a cavity there between, facing the bottom cover sheets of the respective boards.

Board Core

The board core forms the majority of the volume of the composite gypsum board. In some embodiments, the board core forms at least about 60% of the board volume, e.g., at least about 700/o of the board volume, at least about 80% of the board volume, at least about 90% of the board volume, at least about 92%, at least about 95%, at least about 97%, etc. While the concentrated layer has substantial thickness, the board core can be considerably thicker. For example, in some embodiments, the dry board core can be from about 2.5 times to about 35 times as thick as the dry concentrated layer, e.g., from about 2.5 times to about 30 times, from about 2.5 times to about 25 times, from about 2.5 times to about 20 times, from about 2.5 times to about 15 times, from about 2.5 times to about 10 times, from about 2.5 times to about 5 times, from about 2.8 times to about 35 times, from about 2.8 times to about 30 times, from about 2.8 times to about 25 times, from about 2.8 times to about 20 times, from about 2.8 times to about 15 times, from about 2.8 times to about 10 times, from about 2.8 times to about 5 times, from about 5 times to about 35 times, from about 5 times to about 30 times, from about 5 times to about 25 times, from about 5 times to about 20 times, from about 5 times to about 15 times, or from about 5 times to about 10 times as thick as the concentrated layer.

In some embodiments, the board core is from about 8 times to about 16 times as thick as the concentrated layer, e.g., from about 8 times to about 12 times, from about 9 times to about 16 times, from about 9 times to about 14 times, from about 9 times to about 12 times, from about 10 times to about 16 times, from about 10 times to about 14 times as thick as the concentrated layer, etc.

The board core is formed from at least water and stucco. As referred to herein throughout, stucco can be in the form of calcium sulfate alpha hemihydrate, calcium sulfate beta hemihydrate, and/or calcium sulfate anhydrite. The stucco can be fibrous or non-fibrous. In addition to the stucco and water, the board core is formed from an agent that contributes to its lower density, such as a low density filler (e.g., perlite, low density aggregate or the like), or foaming agents. Various foaming agent regimes are well known in the art. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents. The foam can be pregenerated and then added to the stucco slurry. The pregeneration can occur by inserting air into the aqueous foaming agent. Methods and apparatus for generating foam are well known. See, e.g., U.S. Pat. Nos. 4,518,652; 2,080,009; and 2,017,022.

In some embodiments, the foaming agent comprises, consists of, or consists essentially of at least one alkyl sulfate, at least one alkyl ether sulfate, or any combination thereof but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.0005 wt. %, below about 0.001 wt. %, below about 0.00001 wt. %, etc., based on the weight of stucco, as one of ordinary skill in the art will appreciate.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap, e.g., with an alkoxylated alkyl sulfate soap with an alkyl chain length of 8-12 carbon atoms and an alkoxy (e.g., ethoxy) group chain length of 1-4 units. The second foaming agent is optionally an unalkoxylated (e.g., unethoxylated) alkyl sulfate soap with an alkyl chain length of 6-20 carbon atoms, e.g., 6-18 or 6-16 carbon atoms. Regulating the respective amounts of these two soaps, in accordance with some embodiments, is believed to allow for control of the board foam structure until about 100% stable soap or about 100% unstable soap is reached.

In some embodiments, a fatty alcohol optionally can be included with the foaming agent, e.g., in a pre-mix to prepare the foam. This can result in an improvement in the stability of the foam, thereby allowing better control of foam (air) void size and distribution. The fatty alcohol can be any suitable aliphatic fatty alcohol. It will be understood that, as defined herein throughout, "aliphatic" refers to alkyl, alkenyl, or alkynyl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds.

In some embodiments, the optional fatty alcohol is a $C_6$-$C_{20}$ fatty alcohol (e.g., $C_6$-$C_{18}$, $C_6$-$C_{16}$, $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{14}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, nonanol, decanol, undecanol, dodecanol, or any combination thereof. The $C_{10}$-$C_{20}$ fatty alcohol comprises a linear or branched $C_6$-$C_{20}$ carbon chain and at least one hydroxyl group. The hydroxyl group can be attached at any suitable position on the carbon chain but is preferably at or near either terminal carbon. In certain embodiments, the hydroxyl group can be attached at the $\alpha$-, $\beta$-, or $\gamma$-position of the carbon chain, for example, the $C_6$-$C_{20}$ fatty alcohol can comprise the following structural subunits:

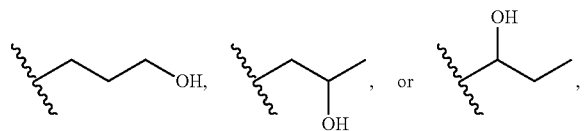

Thus, examples of a desired optional fatty alcohol in accordance with some embodiments are 1-dodecanol, 1-undecanol, 1-decanol, 1-nonanol, 1-octanol, or any combination thereof.

In some embodiments, the optional foam stabilizing agent comprises the fatty alcohol and is essentially free of fatty acid alkyloamides or carboxylic acid taurides. In some embodiments, the optional foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.0001 wt. %, such as below about 0.00005 wt. %, below about 0.00001 wt. %, below about 0.000001 wt. %, etc., based on the weight of stucco, as one of ordinary skill in the art will appreciate.

It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 μm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc.

As used herein, a void size is calculated from the largest diameter of an individual void in the core. The largest diameter is the same as the Feret diameter. The largest diameter of each defined void can be obtained from an image of a sample. Images can be taken using any suitable technique, such as scanning electron microscopy (SEM), which provides two-dimensional images. A large number of pore sizes of voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the void sizes. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void. The sample can be obtained by sectioning a gypsum board.

The foaming agent can be included in the core slurry in any suitable amount, e.g., depending on the desired density. In some embodiments, the foaming agent is present in the slurry for forming the board core, e.g., in an amount of less than about 0.5% by weight of the stucco such as about 0.01% to about 0.5%, about 0.01% to about 0.4%, about 0.01% to about 0.3%, about 0.01% to about 0.25%, about 0.01% to about 0.2%, about 0.01% to about 0.15%, about 0.01% to about 0.1%, about 0.02% to about 0.4%, about 0.02% to about 0.3%, about 0.02% to about 0.2%, etc., all by weight of the stucco. Since the concentrated layer has a higher density, the slurry for forming the concentrated layer can be made with less (or no) foam, e.g., in an amount from about 0.0001% to about 0.05% by weight of the stucco, e.g., from about 0.0001% to about 0.025% by weight of the stucco, from about 0.0001% to about 0.02% by weight of the stucco, or from about 0.001% to about 0.015% by weight of the stucco.

The fatty alcohol can be present, if included, in the core slurry in any suitable amount. In some embodiments, the fatty alcohol is present in the core slurry in an amount of from about 0.0001% to about 0.03% by weight of the stucco, e.g., from about 0.0001% to about 0.025% by weight of the stucco, from about 0.0001% to about 0.02% by weight of the stucco, or from about 0.0001% to about 0.01% by weight of the stucco. Since the concentrated layer slurry can have less or no foam, the fatty alcohol is not required in the concentrated layer, or else can be included in a lower amount, such as from about 0.0001% to about 0.004% by weight of the stucco, e.g., from about 0.00001% to about 0.003% by weight of the stucco, from about 0.00001% to about 0.0015% by weight of the stucco, or from about 0.00001% to about 0.001% by weight of the stucco.

Enhancing agent for imparting strength properties as described herein can also optionally be included in the slurry for forming the board core. Other ingredients as known in the art can also be included in the board core slurry, including, for example, accelerators, retarders, etc. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

In addition, the board core and/or concentrated layer can be further formed from at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. For naphthalenesulfonate dispersants, in some embodiments, they are selected to have molecular weights from about 3,000 to about 10,000 (e.g., about 8,000 to about 10,000). In some embodiments, higher water demand naphthalenesulfonates can be used, e.g., having molecular weights above 10,000. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals, Ambler, Pa.

If included, the dispersant can be provided in any suitable amount. In some embodiments, for example, the dispersant can be present in the concentrated layer slurry in an amount, for example, from about 0.05% to about 0.5%, e.g., about 0.1% to about 0.2% by weight of the stucco, and can be present in the board core slurry in an amount, for example, from about 0% to about 0.7%, e.g., 0% to about 0.4% by weight of the stucco.

In some embodiments, the board core and/or concentrated layer can be further formed from at least one phosphate-containing compound, if desired, to enhance green strength, dimensional stability, and/or sag resistance. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Green strength refers to the strength of the board while still wet during manufacture. Due to the rigors of the manufacturing process, without sufficient green strength, a board precursor can become damaged on a manufacturing line.

Trimetaphosphate compounds can be used, including, for example, sodium trimetaphosphate, potassium trimetaphosphate, lithium trimetaphosphate, and ammonium trimnetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the polyphosphate can be present in any suitable amount. To illustrate, in some embodiments, the polyphosphate can be present in the concentrated layer slurry in an amount, for example, from about 0.1% to about 1%, e.g., about 0.2% to about 0.4% by weight of the stucco, and is present in the board core slurry in an amount, for example, from about 0% to about 0.5%, e.g., from about 0% to about 0.2% by weight of the stucco. Thus, the dispersant and polyphosphate optionally can be in any suitable amount in the core slurry and/or in the concentrated layer slurry, such that in some embodiments, the core slurry contains a higher weight percentage of the dispersant and/or polyphosphate than the concentrated layer slurry. In alternate embodiments, the dispersant and/or polyphosphate are included in higher weight percentage in the concentrated layer slurry than in the core slurry (including core slurries with zero dispersant and/or polyphosphate) (with or without the enhancing additive being more concentrated in the concentrated layer).

The board core can have any suitable density useful in contributing to a desired total composite board density, such as, for example, a core density of from about 16 pcf (about 260 kg/m³) to about 40 pcf, e.g., from about 18 pcf to about 40 pcf, 18 pcf to about 38 pcf, 18 pcf to about 36 pcf, 18 pcf to about 32 pcf, 20 pcf to about 40 pcf, 20 pcf to about 36 pcf, 20 pcf to about 32 pcf, 22 pcf to about 40 pcf, 22 pcf to about 36 pcf, 22 pcf to about 32 pcf, 26 pcf to about 40 pcf, 26 pcf to about 36 pcf, or 26 pcf to about 32 pcf. In some embodiments, the board core has an even lower density, e.g., about 30 pcf or less, about 29 pcf (about 460 kg/m³) or less, about 28 pcf or less, about 27 pcf (about 430 kg/m³) or less, about 26 pcf or less, etc. For example, in some embodiments, the core density is from about 12 pcf (about 190 kg/m³) to about 30 pcf, from about 14 pcf (about 220 kg/m³) to about 30 pcf, 16 pcf to about 30 pcf, 16 pcf to about 28 pcf, 16 pcf to about 26 pcf, 16 pcf to about 22 pcf (about 350 kg/m³), 18 pcf to about 30 pcf, 18 pcf to about 28 pcf, 18 pcf to about 26 pcf, 18 pcf to about 24 pcf, 20 pcf to about 30 pcf, 20 pcf to about 28 pcf, 20 pcf to about 26 pcf, 20 pcf to about 24 pcf, 22 pcf to about 28 pcf, etc.

Concentrated Layer

The concentrated layer is "concentrated" in some embodiments because of the presence of an enhancing additive in the concentrated layer slurry in an amount that is more concentrated than the amount by weight, if any, of the same enhancing additive in the board core slurry. In some embodiments, the concentrated layer has a density that is at least about 1.1 times higher than the density of the board core, and/or has substantial thickness, such as at least about 0.02 inches (about 0.05 cm).

The concentrated layer is formed from slurry comprising water and cementitious material, such as stucco, which hydrates to form a set hydrated material, e.g., continuous crystalline matrix of set gypsum, in the final product. In preferred embodiments, the cementitious material is stucco, and the slurry for forming the concentrated layer is a stucco slurry. As noted, the slurry for forming the concentrated layer further comprises an enhancing additive in a higher relative weight concentration than the concentration of the enhancing additive in the slurry for forming the board core. The slurry for forming the concentrated layer can optionally include foaming agent or other lightweight agent as described herein to produce the desired density for the concentrated layer. If included, in some embodiments the foaming or other lightweight agent will be present in a lower amount in the slurry for forming the concentrated layer, or the foaming agent can be "beaten out" to at least some extent to reduce the population of foam voids as known in the art in order to achieve the desired higher density than the density of the board core. Thus, the formation of the concentrated layer to the desired density through an effective (or no) amount of foaming agent or other lightweight agent can be achieved as described herein and through the ordinary skill in the art. Other ingredients such as accelerator and retarder can optionally be included in the concentrated layer as desired as described herein.

Fibers can further be included in the concentrated layer as an optional additive to improve the process of preparing gypsum board. In this regard, as explained herein, the concentrated layer slurry can be applied to the paper, e.g., at a high rate of speed and with the use of a roller or other spreading means, which forms a head of slurry that accumulates upstream of the roller before it is applied evenly to the paper downstream of the roller (and whereby board edges are typically formed around the ends of the roller from the concentrated layer slurry). The environment in which the concentrated layer is applied is transient with three-dimensional oscillation, leading to scalloping in the slurry, whereby relatively large air entrainments can occur, which can cause a rough, uneven slurry that can lead to defects in the board if not addressed. Such defects can include the formation of large air pockets which are referred to as voids or blisters, as well as delamination of the paper, soft and/or hard edges, etc.

There are a variety of mechanical and other treatments available for addressing the scalloping in the flow induced by the unsteady environment in the process, including the use of mechanical pieces to break up air pockets as known in the art, such as vibrators on the line, as well as slurry spreaders, various mixer discharge treatments, as well as formulation adjustments, including water/stucco ratio, viscosity of the slurry, etc. However, the inventors have discovered another optional technique, which is the addition of fiber to the concentrated layer slurry as a way to form a smoother slurry, for example, at the head where the concentrated layer is applied (e.g., upstream of a roller in a preferred embodiment), with less scalloping and less large air pockets. While not wishing to be bound by any particular theory, it is believed that the fibers advantageously improve the rheology of the slurry in order to ensure a smoother flow. It is also believed that the fibers improve the hydrodynamic properties of the slurry such that viscosity, rheology and the balance of interparticle forces of the slurry are improved, the slurry is more evenly distributed on the application roller, and undesirable entrained air is more easily released from the slurry.

The fibers can be in the form of any suitable fibers. In some embodiments, the fibers can be in the form of one or more of glass fibers, mineral fibers, carbon fibers, paper fibers, and mixtures of such fibers, as well as other comparable fibers providing comparable benefits to the process and/or end product. In some embodiments, glass fibers are incorporated in the concentrated layer slurry and resulting crystalline core structure. Glass fibers are preferred because they do not absorb water.

In the case of some fibers, such as glass fibers, it can be useful in some embodiments to optionally treat the fibers with sizing agent additive to improve their properties and handling. For example, sizing agents can allow for sizing of individual fibers in order to, e.g., change surface coating and properties and typically be in the form of one or more of organofunctionalized silanes, forming agents, surfactants, defoamers, lubricants and/or stabilizers. As one of ordinary skill in the art will appreciate, the precise selection of each ingredient can vary depending on fiber properties and the desired application. For example, the silanes can be, e.g., amino based, such as for, example, aminopropyltriethoxysilane or aminoethylaminopropyltrimethoxysilane, vinyl based such as for example, vinyltrimethoxysilane or vinyltriacetoxysilane, alkyl based such as methyltrimethoxysilane or methyltriethoxysilane, or any combination thereof.

Forming agents are often polymers and can be hydrophobic to provide desired wetting characteristics and protection from fiber-to-fiber damage. The forming agents can be in the form of, for example, polyurethanes, polyvinyl acetates, polyesters, polyalkenes and epoxies. Cationic lubricants can optionally be added and can be in the form of aliphatic ethanolamides such as stearic ethanolamide, or polyethyleneimine polyamides, alkylamidoalkyl sultaines or polyethylene oxide, or any combination thereof. Surfactants can optionally be included to emulsify the forming agent, e.g., when the forming agent is hydrophobic. In some embodiments, the surfactant if included is nonionic or slightly cationic, and can be in the form of an amide or other suitable form, e.g., polyoxyethylene glycol alkyl esters, copolymers of polyethylene glycol and polypropylene glycol, cocamide monoethanolamine, or any combination thereof. Defoamers can provide benefit because they control foam formation with glass fiber, and any suitable defoamer can be used. For example, suitable defoamers can be siloxane based, oil based or polymer based, such as, but not limited to mineral oil, waxes, ethylene bis stearamide, silicone oil, polyethylene glycol and polypropylene glycol copolymers based defoamers, or any combination thereof. Stabilizers provide the benefit of stabilizing the sizing formulation and any suitable stabilizer can be used. In some embodiments, additive such as lubricant provides a positive surface charge which is believed to further improve slurry flow.

If included, the sizing agent can be provided in any suitable amount in the slurry for forming the concentrated layer. For example, the sizing agent can be provided in an amount of from about 0.02 wt. % to about 2 wt. % of the fibers, such as from about 0.05 wt. % to about 1 wt. %, or from about 0.1 wt. % to about 1.5 wt. % of the fibers. For the weight percentages of ingredients provided herein in relation to either the board core slurry or concentrated layer slurry, in some embodiments, the concentrated layer and/or board core in the board product can contain the recited ingredient in an amount within the recited ranges.

The fibers (e.g., glass fiber) can have any suitable length. For example, in some embodiments, the fibers can have an average length of from about 0.125 inch (about 0.32 cm) to about 1 inch (about 2.54 cm), such as, for example, from about 0.125 inch to about 0.75 inch (about 1.9 cm), from about 0.125 inch to about 0.5 inch (about 1.3 cm), from about 0.125 inch to about 0.375 inch (about 1 cm), from about 0.125 inch to about 0.25 inch (about 0.6 cm), from about 0.25 inch to about 1 inch, from about 0.25 inch to about 0.75 inch, from about 0.25 inch to about 0.5 inch, from about 0.25 inch to about 0.375 inch, from about 0.375 inch to about 1 inch, from about 0.375 inch to about 0.75 inch, from about 0.375 inch to about 0.5 inch, from about 0.5 inch to about 1 inch, from about 0.5 inch to about 0.75 inch, or from about 0.75 inch to about 1 inch.

The fibers (e.g., glass fiber) can have any suitable average diameter. For example, in some embodiments the fibers can have an average diameter of from about 5 microns to about 20 microns, from about 10 microns to about 15 microns, from about 10 microns to about 20 microns, from about 8 microns to about 18 microns, from about 5 microns to about 25 microns, from about 9 microns to about 20 microns, from about 10 microns to about 18 microns, from about 7 microns to about 18 microns, from about 10 microns to about 25 microns, a diameter of about 11 to about 17 microns, or a diameter of from about 15 microns to about 17 microns.

In some embodiments, such glass fibers can have an average length of about 0.5 to about 0.675 inches (about 1.7 cm) and a diameter of about 13 to about 16 microns, an average length of about 0.5 to about 0.75 inches and a diameter of about 11 to about 17 microns, or an average fiber length of 0.5 inch and an average diameter of from about 15.24 microns to about 16.51 microns.

The aspect ratio of the fibers refers to the length divided by the diameter and in practice is believed to influence the slurry flow characteristics. To make the units consistent, the length in inches can be converted into microns such that the values are unitless. In some embodiments, the preferred aspect ratio is from about 200 to about 2000, such as from about 400 to about 1300, e.g., from about 800 to about 1500, from about 250 to about 1000, from about 500 to about 1500, or from about 700 to about 1600, from about 800 to about 1400.

If included, fibers, such as glass fibers, are present in the slurry for forming the concentrated layer in any suitable amount, such as, from about 0.1% to about 3%, e.g., from about 0.13% to about 2.5%, or from about 0.5% to about 1% by weight of the stucco, and is present in the board core in any suitable amount, such as from about 0% to about 1%, e.g., from 0% to about 0.5% by weight of the stucco. If desired, the fiber (and the aforementioned associated additives such as sizing agent, etc) can also be included in the core in any suitable amount such as these enumerated weight percentages.

The concentrated layer desirably has substantial thickness. In some embodiments, the dry concentrated layer has a substantial thickness of at least about 0.02 inches (about 0.05 cm), such as from about 0.02 inches to about 0.2 inches (about 0.5 cm). For example, in various embodiments, the concentrated layer has a substantial thickness with a minimum thickness of at least about 0.025 inches (about 0.06 cm), at least about 0.03 inches (about 0.075 cm), at least about 0.035 inches (about 0.09 cm), at least about 0.04 inches (about 0.1 cm), at least about 0.045 inches (about 0.11 cm), at least about 0.05 inches (about 0.13 cm), at least about 0.055 inches (about 0.14 cm), at least about 0.06 inches (about 0.15 cm), at least about 0.065 inches (about 0.17 cm), at least about 0.07 inches (about 0.18 cm), at least about 0.075 inches (about 0.19 cm), at least about 0.08 inches (about 0.2 cm), at least about 0.085 inches (about 0.22 cm), at least about 0.09 inches (about 0.23 cm), at least about 0.095 inches (about 0.24 cm), at least about 0.1 inch (about 0.254 cm), at least about 0.11 inch (about 0.28 cm), at least about 0.12 inch (about 0.3 cm), at least about 0.13 inch (about 0.33 cm), at least about 0.14 inch (about 0.36 cm), at least about 0.15 inch (about 0.38 cm), or at least about 0.16 inch (about 0.41 cm); wherein each of these ranges has a suitable upper limit as mathematically appropriate, such as, for example, about 0.2 inches, about 0.185 inches (about 0.47 cm), about 0.175 inches (about 0.45 cm), about 0.16 inches, about 0.15 inches (about 0.38 cm), about 0.145 inches (about 0.37 cm), about 0.13 inches, about 0.12 inches (about 0.3 cm), 0.1 inch, about 0.09 inches (0.23 cm), about 0.08 inches, about 0.07 inches, about 0.06 inches, about 0.055 inches, about 0.05 inches, about 0.045 inches, about 0.04 inches, about 0.035 inches, etc.).

To illustrate, but not by way of any limitation, the dry concentrated layer can have a thickness from about 0.02 inches to about 0.175 inches, e.g., from about 0.02 inches to about 0.15 inches, from about 0.02 inches to about 0.12 inches, from about 0.02 inches to about 0.1 inches, from about 0.02 inches to about 0.08 inches, from about 0.02 inches to about 0.055 inches, from about 0.02 inches to about 0.05 inches, from about 0.02 inches to about 0.04 inches, from about 0.02 inches to about 0.03 inches, from about 0.03 inches to about 0.2 inches, from about 0.03 inches to about 0.175 inches, from about 0.03 inches to about 0.15 inches, from about 0.03 inches to about 0.12 inches, from about 0.03 inches to about 0.1 inches, from about 0.03 inches to about 0.08 inches, from about 0.03 inches to about 0.055 inches, from about 0.03 inches to about 0.05 inches, from about 0.04 inches to about 0.2 inches, from about 0.04 inches to about 0.175 inches, from about 0.04 inches to about 0.15 inches, from about 0.04 inches to about 0.12 inches, from about 0.04 inches to about 0.1 inches, from about 0.04 inches to about 0.08 inches, from about 0.04 inches to about 0.055 inches, from about 0.04 inches to about 0.05 inches, from about 0.05 inches to about 0.2 inches, from about 0.05 inches to about 0.175 inches, from about 0.05 inches to about 0.15 inches, from about 0.05 inches to about 0.12 inches, from about 0.05 inches to about 0.1 inches, from about 0.05 inches to about 0.8 inches, from about 0.06 inches to about 0.2 inches, from about 0.06 inches to about 0.175 inches, from about 0.06 inches to about 0.15 inches, from about 0.06 inches to about 0.12 inches, from about 0.06 inches to about 0.1 inches, from about 0.06 inches to about 0.8 inches, etc.

The concentrated layer preferably has a higher dry density and/or dry strength than the density of the board core. For example, in some embodiments, the concentrated layer has a density that is at least about 1.1 times greater than the density of the board core, e.g., at least about 1.2 times greater, at least about 1.3 times greater, at least about 1.4 times greater, at least about 1.5 times greater, at least about 1.6 times greater, at least about 1.7 times greater, at least about 1.8 times greater, at least about 1.9 times greater, at least about 2 times greater, etc. wherein each of these ranges has a suitable upper limit as mathematically appropriate, such as, for example, about 3 times greater, about 2.9 times greater, about 2.8 times greater, about 2.7 times greater, about 2.6 times greater, about 2.5 times greater, about 2.4 times greater, about 2.3 times greater, about 2.2 times greater, about 2.1 times greater, about 2 times greater, about 1.9 times greater, about 1.8 times greater, about 1.7 times greater, about 1.6 times greater, about 1.5 times greater, about 1.4 times greater, about 1.3 times greater, and about 1.2 times greater.

Thus, for example, the concentrated layer can have a dry density that is from about 1.1 to about 3 times the density of the board core, e.g., from about 1.1 to about 3 times, from about 1.1 to about 2.7 times, from about 1.1 to about 2.5 times, from about 1.1 to about 2.2 times, from about 1.1 to about 2 times, from about 1.1 to about 1.7 times, from about 1.1 to about 1.5 times, from about 1.1 to about 1.4 times, from about 1.1 to about 1.3 times, from about 1.2 to about 3 times, from about 1.2 to about 2.5 times, from about 1.2 to about 2.2 times, from about 1.2 to about 2 times, from about 1.2 to about 1.7 times, from about 1.2 to about 1.5 times, from about 1.2 to about 1.4 times, from about 1.2 to about 1.3 times, from about 1.3 to about 3 times, from about 1.3 to about 2.5 times, from about 1.3 to about 2 times, from about 1.3 to about 1.7 times, from about 1.3 to about 1.5 times, from about 1.3 to about 1.4 times, from about 1.4 to about 3 times, from about 1.4 to about 2.5 times, from about 1.4 to about 2.5 times, from about 1.4 to about 2 times, from about 1.4 to about 1.7 times, from about 1.4 to about 1.6 times, from about 1.4 to about 1.5 times, from about 1.5 to about 3 times, from about 1.5 to about 2.5 times, from about 1.5 to about 2 times, from about 1.5 to about 1.8 times, from about 1.5 to about 1.7 times, from about 1.5 to about 1.6 times, from about 1.6 to about 3 times, from about 1.6 to about 2.5 times, from about 1.6 to about 2 times, from about 1.1 to about 1.8 times, from about 1.7 to about 3 times, from about 1.7 to about 2.5 times, from about 1.7 to about 2.2 times, from about 1.7 to about 2 times, from about 1.7 to about 1.9 times, from about 1.8 to about 3 times, from about 1.8 to about 2.7 times, from about 1.8 to about 2.5 times, from about 1.8 to about 2.2 times, from about 1.8 to about 2 times, from about 1.9 to about 3 times, from about 1.9 to about 2.7 times, from about 1.9 to about 2.5 times, from about 1.9 to about 2.2 times, from about 2 to about 3 times, etc.

The composite gypsum board can be designed to demonstrate any suitable dry density differential between the concentrated layer and the board core. In some embodiments, the density differential between the concentrated layer and the board core can be at least about 8 pcf (about 130 kg/m$^3$). For example, in some embodiments, the dry density differential between the concentrated layer and the bonding layer can be at least about 10 pcf, at least about 12 pcf, at least about 14 pcf, at least about 16 pcf, at least about 18 pcf, at least about 20 pcf, etc. In some embodiments, the density differential between the concentrated layer and the board core is from about 8 pcf to about 50 pcf, such as about 8 pcf to about 45 pcf (about 720 kg/m$^3$), about 8 pcf to about 40 pcf, about 8 pcf to about 35 pcf, 8 pcf to about 30 pcf, about 8 pcf to about 25 pcf (about 400 kg/m$^3$), about 8 pcf to about 20 pcf, about 8 pcf to about 15 pcf (about 240 kg/m$^3$), about 8 pcf to about 12 pcf, about 10 pcf (about 160 kg/m$^3$) to about 50 pcf, about 10 pcf to about 45 pcf, about 10 pcf to about 40 pcf, about 10 pcf to about 35 pcf, about 10 pcf to about 30 pcf, about 10 pcf to about 25 pcf, about 10 pcf to about 20 pcf, about 10 pcf to about 15 pcf, about 15 pcf to about 50 pcf (about 800 kg/m$^3$), about 15 pcf to about 45 pcf, about 15 pcf to about 40 pcf, about 15 pcf to about 35 pcf, about 15 pcf to about 30 pcf, about 15 pcf to about 25 pcf, about 15 pcf to about 20 pcf, about 20 pcf to about 50 pcf, about 20 pcf to about 45 pcf, about 20 pcf to about 40 pcf, about 20 pcf to about 35 pcf, about 20 pcf to about 30 pcf, about 20 pcf to about 25 pcf, about 25 pcf to about 35 pcf, about 25 pcf to about 30 pcf, etc.

The concentrated layer can have any suitable dry density to fit within the desired parameters of embodiments described herein. In some embodiments, the concentrated layer has a dry density of from about 28 pcf to about 70 pcf (about 1120 kg/m$^3$), such as from about 28 pcf to about 65 pcf (about 1040 kg/m$^3$), from about 28 pcf to about 60 pcf (about 960 kg/m$^3$), from about 28 pcf to about 55 pcf (about 880 kg/m$^3$), from about 28 pcf to about 50 pcf, from about 28 pcf to about 45 pcf, from about 28 pcf to about 40 pcf, from about 28 pcf to about 35 pcf, from about 34 pcf to about 70 pcf, from about 34 pcf to about 65 pcf, from about 34 pcf to about 60 pcf, from about 34 pcf to about 55 pcf, from about 34 pcf to about 50 pcf, from about 34 pcf to about 45 pcf, from about 34 pcf to about 40 pcf, from about 38 pcf to about 70 pcf, from about 38 pcf to about 65 pcf, from about 38 pcf to about 60 pcf, from about 38 pcf to about 55 pcf, from about 38 pcf to about 50 pcf, from about 38 pcf to about 45 pcf, from about 40 pcf to about 70 pcf, from about 40 pcf to about 65 pcf, from about 40 pcf to about 60 pcf, from about 40 pcf to about 55 pcf, from about 40 pcf to about 50 pcf, from about 40 pcf to about 45 pcf, from about 36 pcf to about 38 pcf, etc.

The concentrated layer generally has a dry stiffness value that is greater than the dry stiffness value of the board core. As noted, Young's modulus of elasticity can be used as a measure of dry stiffness herein. In some embodiments, the dry concentrated layer has a Young's modulus that is at least about 1.5 times as high as the Young's modulus of the board core, e.g., 2 times as high as the Young's modulus of the board core, such as, for example, from about 2 times to about 10 times, from about 2 times to about 8 times, from about 2 times to about 6 times, from about 2 times to about 4 times, from about 3 times to about 10 times, from about 3 times to about 8 times, from about 3 times to about 6 times, from about 3 times to about 5 times, from about 4 times to about 10 times, from about 4 times to about 8 times, from about 4 times to about 6 times, from about 5 times to about 10 times, from about 5 times to about 8 times, from about 6 times to about 10 times, from about 6 times to about 8 times, etc. In some embodiments, the concentrated layer has a stiffness value that is closer to a stiffness value of the top and/or bottom cover sheet than a stiffness of the board core, when each stiffness value is measured according to Young's modulus. In some embodiments, the concentrated layer has a stiffness value according to Young's modulus that is from about 0.1 to about 0.5 of the Young's modulus for at least one of the cover sheets.

Cover Sheets

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 7-ply and News-Line 3 ply, or 7 ply available from United States Gypsum Corporation, Chicago, Ill.; Grey-Back 3-ply and Manila Ivory 3-ply, available from International Paper, Newport, Ind.; and Manila heavy paper and MH Manila HT (high tensile) paper, available from United States Gypsum Corporation, Chicago, Ill. An exemplary cover sheet paper is 5-ply NewsLine. In some embodiments, the back sheet can optionally define perforations, e.g., pin-holes, therein. Such perforations assist with drying in a kiln to provide an outlet for any steam formed during the heating process.

In addition, the paper (e.g., cellulosic) can comprise any other material or combination of materials. For example, one or both sheets, particularly the face (top) sheet can include polyvinyl alcohol, boric acid, or polyphosphate as described herein (e.g., sodium trimetaphosphate) to enhance the strength of the paper. In some embodiments, the paper can be contacted with a solution of one or more of polyvinyl alcohol, boric acid, and/or polyphosphate so that the paper is at least partially wetted. The paper can be at least partially saturated in some embodiments. The polyvinyl alcohol, boric acid and/or boric acid can penetrate the fibers in the paper in some embodiments. The solution of polyvinyl alcohol, boric acid, and/or polyphosphate can be in any suitable amount and can be applied in any suitable manner as will be appreciated in the art. For example, the solution can be in the form of from about 1% to about 5% solids by weight in water of each ingredient present between the polyvinyl alcohol, the boric acid and/or polyphosphate, which can be added in one solution or if desired in multiple solutions.

In some embodiments, one or both sheets can comprise glass fibers, ceramic fibers, mineral wool, or a combination of the aforementioned materials. One or both sheets in accordance with the present disclosure can be generally hydrophilic, meaning that the sheet is at least partially capable of adsorbing water molecules onto the surface of the sheet and/or absorbing water molecules into the sheet.

In other embodiments, the cover sheets can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m.k.). For example, the thermal conductivity of the top and/or bottom sheet is less than about 0.05 w/(m.k.).

If desired, in some embodiments, one or both cover sheets can optionally include any suitable amount of inorganic compound or mixture of inorganic compounds that adequately imparts greater fire endurance where such properties are sought. Examples of suitable inorganic compounds include aluminum trihydrate and magnesium hydroxide. For example, the cover sheets can comprise any inorganic compound or mixture of inorganic compounds with high crystallized water content, or any compound that releases water upon heating. In some embodiments, the amount of inorganic compound or the total mixture of inorganic compounds in the sheet ranges from about 0.1% to about 30% by weight of the sheet. The inorganic compound or inorganic compounds used in the sheet may be of any suitable particle size or suitable particle size distribution.

Aluminum trihydrate (ATH), also known as alumina trihydrate and hydrated alumina, can increase fire resistance due to its crystallized or compound water content. In some embodiments, ATH can be added in an amount from about 5% to about 30% by total weight of the sheet. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one embodiment is about 1170 Joule/gram. Without being bound by theory, it is believed that the ATH additive decomposes to release approximately 35% of the water of crystallization as water vapor when heated above 205° C. in accordance with the following equation: $Al(OH)_3 \rightarrow Al_2O_3 + 3H_2O$.

A cover sheet comprising inorganic particles of high water content, such as ATH, can increase fire endurance of the composite board. The inorganic compound or mixture of compounds is incorporated into the sheet in some embodiments. A cover sheet such as paper comprising ATH can be prepared by first diluting cellulosic fiber in water at about 1% consistency, then mixing with ATH particles at a predetermined ratio. The mixture can be poured into a mold, the bottom of which can have a wire mesh to drain off water. After draining, fiber and ATH particles are retained on the wire. The wet sheet can be transferred to a blotter paper and dried at about 200-360° F.

In some embodiments, as described for inclusion in the cover sheet or in a stucco slurry, e.g., ATH particles of less than about 20 µm are preferred, but any suitable source or grade of ATH can be used. For example, ATH can be obtained from commercial suppliers such as Huber under the brand names SB 432 (10 µm) or Hydral® 710 (1 µm).

In some embodiments, the cover sheet may comprise magnesium hydroxide. In these embodiments, the magnesium hydroxide additive preferably has a heat of decomposition greater than about 1000 Joule/gram, such as about 1350 Joule/gram, at or above 180° C. to 205° C. In such embodiments, any suitable magnesium hydroxide can be used, such as that commercially available from suppliers, including Akrochem Corp. of Akron, Ohio.

In other embodiments, the cover sheets can be "substantially free" of inorganic compounds such as ATH, magnesium hydroxide, or a mixture thereof, which means that the cover sheets contain either (i) 0 wt. % based on the weight of the sheet, or no such inorganic compounds such as ATH, magnesium hydroxide, or a mixture thereof, or (ii) an ineffective or (iii) an immaterial amount of inorganic compounds such as ATH, magnesium hydroxide, or a mixture thereof. An example of an ineffective amount is an amount below the threshold amount to achieve the intended purpose of using inorganic compounds such as ATH, magnesium hydroxide, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.1 wt. %, below about 0.05 wt. %, below about 0.01 wt. %, etc.

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. In some embodiments, at least one of the cover sheets, e.g., the top (face) cover sheet, has a density that is equal to or greater than the density of the concentrated layer. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf to about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (about 160 g/m$^2$), e.g., from about 33 lbs/MSF to about 65 lbs/MSF (about 320 g/m$^2$), from about 33 lbs/MSF to about 60 lbs/MSF (about 290 g/m$^2$), 33 lbs/MSF to about 58 lbs/MSF (about 280 g/m$^2$), from about 33 lbs/MSF to about 55 lbs/MSF (about 270 g/m$^2$), from about 33 lbs/MSF to about 50 lbs/MSF (about 240 g/m$^2$), from about 33 lbs/MSF to about 45 lbs/MSF (about 220 g/m$^2$), etc, or less than about 45 lbs/MSF, can be utilized in some embodiments. In other embodiments, one or both cover sheets has a basis weight from about 38 lbs/MSF (about 190 g/m$^2$) to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, or from about 38 lbs/MSF to about 45 lbs/MSF.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 45 lbs/MSF, e.g., from about 33 lbs/MSF to about 45 lbs/MSF or from about 33 lbs/MSF to about 40 lbs/MSF).

Enhancing Additive

The enhancing additive provides desired strength properties. In preferred embodiments, the enhancing additive is more concentrated in the concentrated layer slurry than in the board core slurry (and/or the resulting layers in the board product), as discussed herein. Examples of suitable enhancing additives help provide strength, such as starch, polyvinyl alcohol, boric acid, gypsum-cement, nano-cellulose, micro-cellulose, or any combination thereof. The use of the singular term enhancing additive herein is used for convenience but will be understood to encompass the plural, i.e., more than one enhancing additive in combination, as one of ordinary skill in the art will readily appreciate. Thus, an enhancing additive may comprise one or more of starch, polyvinyl alcohol, boric acid, gypsum-cement, nano-cellulose, and/or micro-cellulose.

In some embodiments, the enhancing additive comprises an ingredient, such as starch, that is effective to increase the dry strength of the composite gypsum board relative to the strength of the composite board without the ingredient such as starch (e.g., via increased compressive strength, nail pull resistance, flexural strength, core hardness, or other strength parameter). With respect to starch, any suitable strength enhancing starch can be used, including hydroxyalkylated starches such as hydroxyethylated or hydroxypropylated starch, or a combination thereof, uncooked starches, or pregelatinized starches, which are generally preferred over acid-modifying migrating starches which generally provide paper-core bond enhancement but not core strength enhancement. However, if desired, the acid-modifying migrating starch can be included with the enhancing additive in some embodiments.

The starch can be cooked or uncooked. Uncooked starches are characterized as being cold water insoluble and having a semi-crystalline structure. Typically, uncooked starches are obtained by wet milling and are not modified by heating wet starch as in the case of cooked starches. Cooked starches are characterized by being cold water soluble and having a non-crystalline structure. Cooked starches are prepared by heating wet starch, and can be prepared, e.g., by extrusion techniques. See, e.g., co-pending U.S. patent application Ser. Nos. 14/494,547; 14/044,582; and Ser. No. 13/835,002, which extrusion techniques are incorporated by reference.

Cooked starches are sometimes referred to as pregelatinized starches, because the crystalline structure of the starch granules melts, and results in starch gelatinization, which is characterized by the disappearance of the birefringence under a microscope with a polarized light. Preferred starches, whether cooked or uncooked, are different than acid-modified migratory starches which do not confer the same strength properties and are used in the art for paper-core bond enhancement as they migrate to the paper-core interface due to their smaller chain lengths. The acid-modified migratory starches have minimal molecular weight, typically below about 6,000 Daltons. In some embodiments, preferred starches in accordance with embodiments of the disclosure have higher molecular weights, e.g., at least about 30,000 Daltons.

For example, in some embodiments, the starch added to the concentrated layer slurry can have a molecular weight of from about 30,000 Daltons to about 150,000,000 Daltons, e.g., from about 30,000 Daltons to about 150,000,000 Daltons, from about 30,000 Daltons to about 100,000,000 Daltons, from about 30,000 Daltons to about 50,000,000 Daltons, from about 30,000 Daltons to about 10,000,000 Daltons, from about 30,000 Daltons to about 5,000,000 Daltons, from about 30,000 Daltons to about 1,000,000

Daltons, from about 30,000 Daltons to about 500,000 Daltons, from about 30,000 Daltons to about 100,000 Daltons, from about 50,000 Daltons to about 150,000,000 Daltons, from about 50,000 Daltons to about 100,000,000 Daltons, from about 50,000 Daltons to about 50,000,000 Daltons, from about 50,000 Daltons to about 10,000,000 Daltons, from about 50,000 Daltons to about 5,000,000 Daltons, from about 50,000 Daltons to about 1,000,000 Daltons, from about 50,000 Daltons to about 500,000 Daltons, from about 50,000 Daltons to about 100,000 Daltons, from about 100,000 Daltons to about 150,000,000 Daltons, from about 100,000 Daltons to about 100,000,000 Daltons, from about 100,000 Daltons to about 50,000,000 Daltons, from about 100,000 Daltons to about 10,000,000 Daltons, from about 100,000 Daltons to about 5,000,000 Daltons, from about 100,000 Daltons to about 1,000,000 Daltons, from about 100,000 Daltons to about 500,000 Daltons, or from about 100,000 Daltons to about 100,000 Daltons, etc.

Properties of uncooked starches include having low viscosity in cold water (i.e., at a temperature of 77° F. (25° C.)), while properties of pregelatinized starches include having instant high viscosity in cold water. Uncooked starches tend to have a viscosity of about 10 centipoise or less in cold water (e.g., from about 1 centipoise to about 10 centipoise, such as from about 3 centipoise to about 7 centipoise), as measured according to a modified rapid viscosity analyzer method. The rapid viscosity analyzer method is explained in the text, Deffenbaugh, L. B. and Walker, C. E., "Comparison of Starch Pasting Properties in the Brabender Viscoamylograph and the Rapid Visco-Analyzer," *Cereal Chemistry*, Vol. 66, No. 6, pp. 493-499 (1989), and modified as defined herein with respect to sample preparation and testing profile as follows. Starch (20 g, dry) is added into water (180 g) in a Waring blender (model 31BL92) while mixing at low speed for 15 seconds. Starch solution (28 g) is weighed into a measuring cup. The paddle speed of the rapid viscosity analyzer is set at 160 rpm. The testing profile is set with an initial temperature of 25° C. for 10 min. Heat to 93° C. at a heating rate of 15° C./min. Keep the temperature at 93° C. for 5 min. Cool to 50° C. at a cooling rate of −15° C./min; and keep at 50° C. for 1 min. The viscosity value measured at 30 seconds is used as the viscosity of the starch.

The pregelatinized starches have "instant" high viscosity in cold water because the starch tends to instantly dissolve in water. Cooked or pregelatinized starches tend to have a cold water viscosity of at least about 100 centipoise (e.g., from about 50 centipoise to about 1000 centipoise, such as from about 350 centipoise to about 1000 centipoise) as measured according to the modified rapid viscosity analyzer method.

In some embodiments, uncooked starches are selected because they are easy to mix with water. This is because of their low viscosity in water. Pregelatinized starches can sometimes cause "fish eye," which is a condition that is characterized by one or more large lumps that form in the water solution during mixing. While not wishing to be bound by any particular theory, during the mixing process, the large lumps are believed to be caused by fast water absorption of the starch, forming a viscous film on the surface of the lump, which prevents water penetration of the lump. Uncooked starches are believed to avoid the fish eye condition because of their cold water insolubility, which results in the separation of starch granules. However, it will be understood that pregelatinized starches can be used in accordance with embodiments of the disclosure inasmuch as they are desirable for the exposure of functional groups which allows for hydrogen bonding between starch and gypsum crystals.

Examples of suitable uncooked starches include, but are not limited to, one or more of native cereal starches, native root starches, native tuber starches, and/or chemically modified starches, with specific representative examples including, e.g., corn starch (normal, waxy, and/or high-amylose), A type wheat starch, B type wheat starch, pea starch, acid modified starches with a molecular weight of at least about 30,000 Daltons, substituted starches having substituted groups (such as acetate, phosphate, hydroxyethyl, hydroxypropyl) on starch hydroxyl groups, or any combination thereof. In some embodiments, the uncooked starch excludes pea starch.

Any suitable pregelatinized starch can be included in the enhancing additive, as described in US 2014/0113124 A1 and US 2015/0010767-A1, which include methods of preparation thereof and desired viscosity ranges described therein. If included, the pregelatinized starch can exhibit any suitable viscosity. In some embodiments, the pregelatinized starch is a mid-range viscosity starch as measured according to the VMA method as known in the art and as set forth in, e.g., US 2014/0113124 A1, which VMA method is hereby incorporated by reference.

Desirable pregelatinized starches in accordance with some embodiments can have a mid-range viscosity, e.g., measured in a 15 wt. % solution of starch in water, of from about 20 centipoise to about 700 centipoise, e.g., from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc.

In accordance with some embodiments, the pregelatinized starch can be prepared as an extruded starch, e.g., where starch is prepared by pregelatinization and acid-modification in one step in an extruder as described in US 2015/0010767-A1, which extrusion method is hereby incorporated by reference. Briefly, any suitable extruder can be used, such as a single-screw extruder (e.g., the Advantage 50 available from American Extrusion International, located in South Beloit, Ill.) or a twin-screw extruder (e.g., the Wenger TX52 available from Wenger located in Sabetha, Kans.). In general, in some embodiments: (a) a precursor to pregelatinized starch, i.e., non-pregelatinized starch, (b) an acid in the form of a weak acid, that substantially avoids chelating calcium ions, and/or a strong acid in a small amount, and (c) water, are mixed and fed into the extruder. In some embodiments, additional water may be added to the extruder. In some embodiments, for example, aluminum sulfate (alum) is an appropriate weak acid to use in preparing the wet starch since it substantially avoids chelating calcium ions.

For example, in some embodiments, weak acid is included in an amount of from about 0.5 wt. % to about 5 wt. % based on the weight of the starch. The amount of strong acid is relatively small, such as about 0.05 wt. % or less by weight of the starch, e.g., from about 0.0001 wt. % to about 0.05 wt. %. The amounts of strong acid used in accordance with some embodiments of the disclosure are considerably smaller than what were included in conventional systems which used, e.g., at least about 2 g of sulfuric acid for 35 g of starch. In some embodiments, the strong acid in small amounts as described above can be used in combination with a weak acid that does not chelate calcium ions, such as alum, as described herein.

While in the extruder, a combination of heating elements and mechanical shearing melts and pregelatinizes the starch, and the weak acid partially hydrolyzes the starch to a desired molecular weight indicated by viscosity as desirable as described herein. For example, the wet starch can be pregelatinized and acid-modified in an extruder having a die at a temperature of from about 150° C. (about 300° F.) to about 210° C. (about 410° F.). Pressure inside the extruder is determined by the raw material being extruded, moisture content, die temperature, and screw speed, which will be recognized by one of ordinary skill in the art. For example, the pressure in the extruder can be at least about 2,000 psi (about 13,800 kPa), e.g., from about 2,000 psi to about 5,000 psi (34,500 kPa). The conditions in the extruder, because of the mechanical energy, will also cause the starch molecules to degrade, which partially produces the same effect of acid-modification. It is believed that because the conditions in an extruder (e.g., high reaction temperature and high pressure) in accordance with some embodiments facilitate this chemical reaction, a weak acid and/or low amounts of a strong acid can be used.

Cold water solubility relates to a pregelatinized starch having any amount of solubility in water at room temperature (about 25° C.). In some embodiments, the pregelatinized starch is partially hydrolyzed and can have desired cold water solubility of from about 70% to about 100%, from about 75% to about 100%, from about 80% to about 100%, from about 85% to about 100%, from about 90% to about 100%, from about 95% to about 100%, from about 70% to about 99%, etc., from about 75% to about 99%, from about 80% to about 99%, from about 85% to about 99%, from about 90% to about 99%, from about 95% to about 99%. In some embodiments, the pregelatinized starch has a cold water viscosity (10% solids, 25° C.) of from about 10 BU to about 120 BU, measured according to the Brabender method where viscosity is measured using a C. W. Brabender Viscograph, e.g., a Viscograph-E that uses reaction torque for dynamic measurement. For example, the cold water viscosity can be, e.g., from about 20 BU to about 110 BU, from about 30 BU to about 100 BU, from about 40 BU to about 90 BU, from about 50 BU to about 80 BU, or from about 60 BU to about 70 BU. It is to be noted that, as defined herein, the Brabender units are measured using a sample cup size of 16 fl. oz (about 500 cc), with a 700 cmg cartridge at an RPM of 75. One of ordinary skill in the art also will readily recognize that the Brabender units can be converted to other viscosity measurements, such as centipoises (e.g., cP=BU×2.1, when the measuring cartridge is 700 cmg) or Krebs units.

In some embodiments, the starch has a cold water viscosity of a 10% slurry of the starch in water when measured at 25° C. of from about 60 cP to about 160 cP, as measured with a Brookfield viscometer with #2 spindle and at a rotation speed of 30 rpm. For example, the cold water viscosity of a 10% slurry of the starch in water when measured at 25° C. can be from about 60 cP to about 150 cP, from about 60 cP to about 120 cP, from about 60 cP to about 100 cP, from about 70 cP to about 150 cP, from about 70 cP to about 120 cP, from about 70 cP to about 100 cP, from about 80 cP to about 150 cP from about 80 cP to about 120 cP, from about 80 cP to about 100 cP, from about 90 cP to about 150 cP, from about 90 cP to about 120 cP, from about 100 cP to about 150 cP, or from about 100 cP to about 120 cP.

If included, the starch of any type described herein as enhancing additive can be present in any suitable amount. In some embodiments, the starch is present in the concentrated layer in an amount from about 5% to about 40%, by weight of the stucco, e.g., from about 5% to about 35% by weight of the stucco, from about 5% to about 30% by weight of the stucco, from about 5% to about 25%, from about 5% to about 20%, from about 5% to about 15%, from about 5% to about 10%, from about 10% to about 30%, from about 10% to about 25%, from about 10% to about 20%, from about 10% to about 15%, etc. The starch can be present in the board core in an amount from about 0% to about 4% by weight of the stucco, e.g., from about 0.1% to about 4% by weight of the stucco, from about 0.1% to about 3% by weight of the stucco, from about 0.1% to about 2% by weight of the stucco, from about 0.1% to about 1% by weight of the stucco, from about 1% to about 4% by weight of the stucco, from about 1% to about 3% by weight of the stucco, from about 1% to about 2% by weight of the stucco, etc.

In some embodiments, with or without starch, the enhancing additive can include polyvinyl alcohol and/or boric acid to enhance strength. In some embodiments, polyvinyl alcohol, boric acid, and starch are all present. While not wishing to be bound by theory, it is believed that the boric acid acts as a cross-linker for the polyvinyl alcohol and starch to further enhance starch. In some embodiments, the concentration of polyvinyl alcohol and/or boric acid in the concentrated layer is believed to positively impact strength in the face paper; this can be compounded by penetrating the face paper with polyvinyl alcohol and/or boric acid as described herein.

If included, the polyvinyl alcohol and boric acid can be present in any suitable amounts. For example, in some embodiments, the polyvinyl alcohol can be present in the concentrated layer in an amount from about 1% to about 5% by weight of the stucco. In addition, the polyvinyl alcohol can be present in the board core in an amount from about 0% to about 1% by weight of the stucco. The boric acid can be present in the concentrated layer in an amount from about 0.1% to about 1% by weight of the stucco, and can be present in the board core in an amount from about 0% to about 0.1% by weight of the stucco.

In some embodiments, the enhancing additive optionally comprises nano-cellulose, micro-cellulose, or any combination thereof in order to enhance strength, e.g., nail pull resistance or other strength parameter. If included, the nano-cellulose, micro-cellulose, or combination thereof can be present in any suitable amount such as, for example, in the concentrated layer slurry in an amount, for example, from about 0.01% to about 2%, e.g., from about 0.05% to about 1% by weight of the stucco, and in the board core slurry in an amount, for example, from about 0% to about 0.5%, e.g., from 0% to about 0.01% by weight of the stucco.

The enhancing additive can comprise gypsum-cement in order to enhance strength, e.g., nail pull resistance or other strength parameter, in some embodiments. The gypsum-cement is optional and can be present in any suitable amount. For example, in some embodiments, it can be included in the concentrated layer in an amount of from about 5% to about 30% by weight of the stucco, and can be present in the board core in an amount from about 0% to about 10% by weight of the stucco.

Board Strength

In some embodiments, composite board made according to the disclosure meets test protocols according to ASTM Standard C473-10. For example, in some embodiments, when the board is cast at a thickness of ½ inch, the dry board has a nail pull resistance of at least about 65 $lb_f$ (pounds force) as determined according to ASTM C473-10 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 65 $lb_f$ to about 100 $lb_f$, from about 65 $lb_f$ to about 95 $lb_f$, from about 65 $lb_f$ to about 90 $lb_f$, from about 65 $lb_f$ to about 85 $lb_f$, from about 65 $lb_f$ to about 80 $lb_f$, from about 65 $lb_f$ to about 75 $lb_f$, from about 68 $lb_f$ to about 100 $lb_f$, from about 68 $lb_f$ to about 95 $lb_f$, from about 68 $lb_f$ to about 90 $lb_f$, from about 68 $lb_f$ to about 85 $lb_f$, from about 68 $lb_f$ to about 80 $lb_f$, from about 70 $lb_f$ to about 100 $lb_f$, from about 70 $lb_f$ to about 95 $lb_f$, from about 70 $lb_f$ to about 90 $lb_f$, from about 70 $lb_f$ to about 85 $lb_f$, from about 70 $lb_f$ to about 80 $lb_f$, from about 72 $lb_f$ to about 100 $lb_f$, from about 72 $lb_f$ to about 95 $lb_f$, from about 72 $lb_f$ to about 90 $lb_f$, from about 72 $lb_f$ to about 85 $lb_f$, from about 72 $lb_f$ to about 80 $lb_f$, from about 72 $lb_f$ to about 77 $lb_f$, from about 72 $lb_f$ to about 75 $lb_f$, from about 75 $lb_f$ to about 100 $lb_f$, from about 75 $lb_f$ to about 95 $lb_f$, from about 75 $lb_f$ to about 90 $lb_f$, from about 75 $lb_f$ to about 85 $lb_f$, from about 75 $lb_f$ to about 80 $lb_f$, from about 75 $lb_f$ to about 77 $lb_f$, from about 77 $lb_f$ to about 100 $lb_f$, from about 77 $lb_f$ to about 95 $lb_f$, from about 77 $lb_f$ to about 90 $lb_f$, from about 77 $lb_f$ to about 85 $lb_f$, or from about 77 $lb_f$ to about 80 $lb_f$.

In some embodiments, board can have an average core hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$, as determined according to ASTM C473-10, method B. In some embodiments, board can have a core hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 20 $lb_f$, from about 11 $lb_f$ to about 19 $lb_f$, from about 11 $lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_f$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_f$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 $lb_f$ to about 20 $lb_f$, from about 18 $lb_f$ to about 19 $lb_f$, from about 19 $lb_f$ to about 25 $lb_f$, from about 19 $lb_f$ to about 22 $lb_f$, from about 19 $lb_f$ to about 21 $lb_f$, from about 19 $lb_f$ to about 20 $lb_f$, from about 21 $lb_f$ to about 25 $lb_f$, from about 21 $lb_f$ to about 22 $lb_f$, or from about 22 $lb_f$ to about 25 $lb_f$.

In some embodiments, the concentrated layer has an average dry core hardness that is at least about 1.5 times greater than the average dry core hardness of the board core, wherein the average core hardness is measured according to ASTM C-473-10, e.g., at least about 2 times greater, 2.5 times greater, 3 times greater, 3.5 times greater, 4 times greater, 4.5 times greater, etc., wherein each of these ranges can have any mathematically appropriate upper limit, such as, for example, 8, 7, 6, 5, 4, 3, or 2.

With respect to flexural strength, in some embodiments, when cast in a board of/inch thickness, the dry board has a flexural strength of at least about 36 $lb_f$ in a machine direction (e.g., at least about 38 $lb_f$, at least about 40 $lb_f$, etc.) and/or at least about 107 $lb_f$ (e.g., at least about 110 $lb_f$, at least about 112 $lb_f$ etc) in a cross-machine direction as determined according to the ASTM standard C473-10. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

Advantageously, in various embodiments at various board densities as described herein, the dry gypsum board can have a compressive strength of at least about 170 psi (1,170 kPa), e.g., from about 170 psi to about 1,000 psi (6,900 kPa), from about 170 psi to about 900 psi (6,200 kPa), from about 170 psi to about 800 psi (5,500 kPa), from about 170 psi to about 700 psi (4,800 kPa), from about 170 psi to about 600 psi (4,100 kPa), from about 170 psi to about 500 psi (3,450 kPa), from about 170 psi to about 450 psi (3,100 kPa), from about 170 psi to about 400 psi (2,760 kPa), from about 170 psi to about 350 psi (2,410 kPa), from about 170 psi to about 300 psi (2,070 kPa), or from about 170 psi to about 250 psi (1,720 kPa). In some embodiments, the board has a compressive strength of at least about 450 psi (3,100 kPa), at least about 500 psi (3,450 kPa), at least about 550 psi (3,800 kPa), at least about 600 psi (4,100 kPa), at least about 650 psi (4,500 kPa), at least about 700 psi (4,800 kPa), at least about 750 psi (5,200 kPa), at least about 800 psi (5,500 kPa), at least about 850 psi (5,850 kPa), at least about 900 psi (6,200 kPa), at least about 950 psi (6,550 kPa), or at least about 1,000 psi (6,900 kPa). In addition, in some embodiments, the compressive strength can be bound by any two of the foregoing points. For example, the compressive strength can be between about 450 psi and about 1,000 psi (e.g., between about 500 psi and about 900 psi, between about 600 psi and about 800 psi, etc.). The compressive strength can be measured using a materials testing system commercially available as ATS machine model 1610, from Applied Test Systems in Butler, Pa. The load is applied continuously and without a shock at speed of 1 inch/imin.

Due at least in part to the concentrated layer and the benefits thereof, surprisingly and unexpectedly, these standards (e.g., nail pull resistance, flexural strength, and core hardness) can be met even with respect to ultra light density board (e.g., about 33 pcf or less, such as about 32 pcf or less, 31 pcf or less, 30 pcf or less, 29 pcf or less, 28 pcf or less, 27 pcf or less, 26 pcf or less, etc.), as described herein. Furthermore, these standards surprisingly can be met in some embodiments while using less overall enhancing additive and with a lighter, weaker, and/or softer core, and/or with lower overall water usage such that embodiments of the disclosure provide manufacturing efficiencies.

Process of Preparing Composite Gypsum Board

Composite gypsum board according to embodiments of the disclosure can be made on typical gypsum wallboard manufacturing lines. For example, board manufacturing techniques are described in, for example, U.S. Pat. No. 7,364,676 and U.S. Patent Application Publication 2010/0247937. Briefly, the process typically involves discharging a cover sheet onto a moving conveyor. Since gypsum board is normally formed "face down," this cover sheet is the "face" cover sheet in such embodiments.

In accordance with aspects of the disclosure, two separate slurries are formed. One slurry is a stucco slurry used to form the board core, and the other slurry is used to form the concentrated layer. The concentrated layer can be formed from any suitable material, including a cementitious material, such as stucco, that hydrates to a set material, e.g., set gypsum. Thus, in various embodiments, slurries containing a desired cementitious material can be prepared. As described herein, in some embodiments where both the board core and the concentrated layer are formed from stucco slurries, the stucco slurry for forming the board core can have a lower WSR than the WSR of the stucco slurry used for making the concentrated layer in some embodiments.

As noted herein, foaming agent (or other lightweight material) is generally more prevalent in the board core slurry to provide its lower density, although some foam or light-weight material can be included in the concentrated layer slurry so long as the density parameters are achieved. In some embodiments, the concentration of the enhancing agent can be greater in the concentrated layer and some enhancing agent may not even be present in the board core slurry in accordance with some embodiments. Accordingly, the feed lines to the respective mixers can be adjusted accordingly, which is well within the level of ordinary skill.

Figure 2:
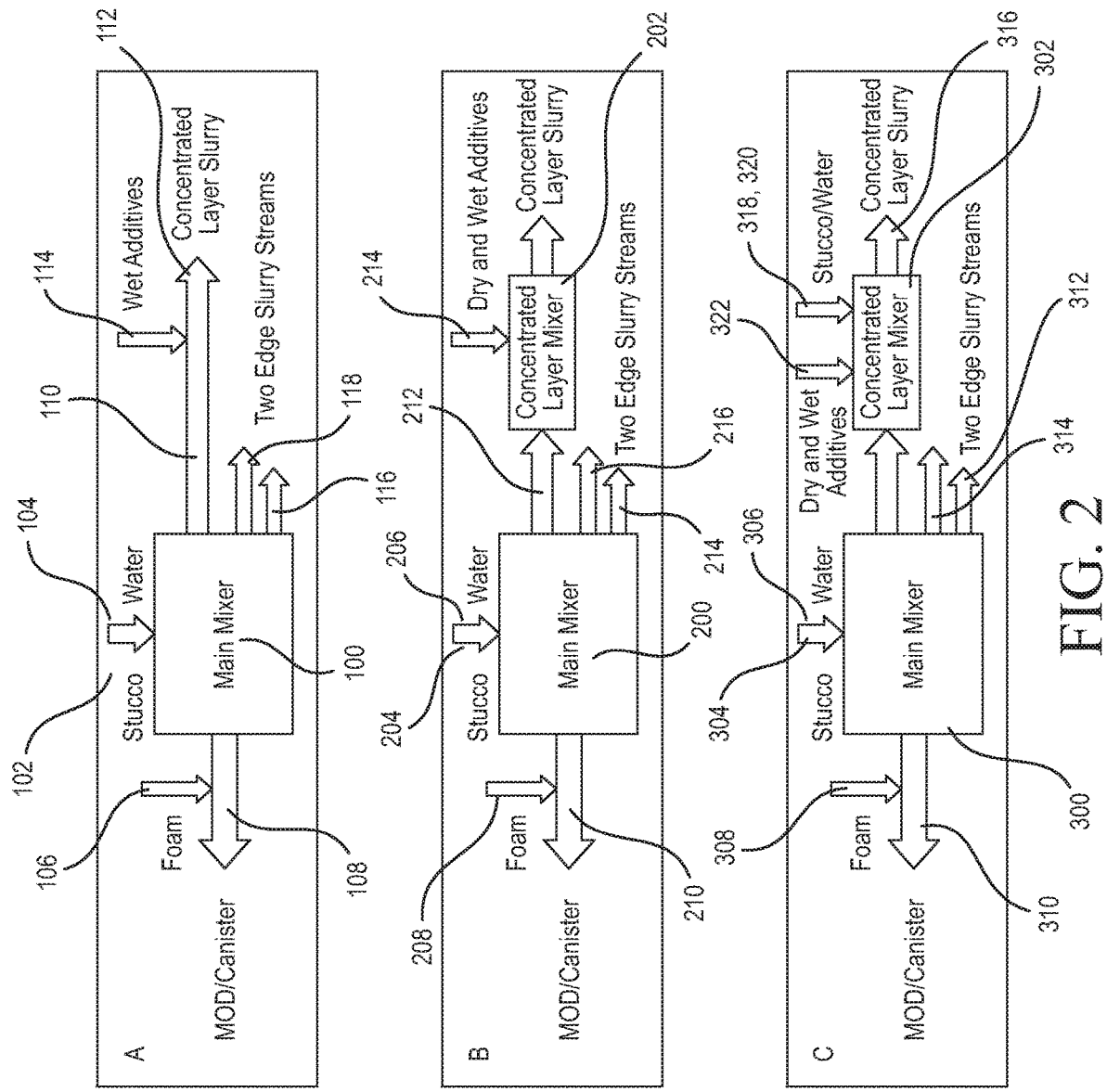
FIG. 2 illustrates schematic flow diagrams of three alternate process arrangements (labeled A, B, and C) that illustrate steps for preparing slurries for the board core and the concentrated layer in accordance with principles of the present disclosure.

The two slurries can be formed in any suitable manner. For example, two separate mixers can be used, where the raw materials are agitated to form the respective slurries. The mixers can be in series or unconnected. Alternatively, one mixer can be used to develop both slurry streams. FIG. 2 illustrates three alternate schematic flow diagrams showing examples of how the slurries can be formed in accordance with the present disclosure. As seen in depiction A of FIG. 2, a single mixer can be used, whereas in depictions B and C, the two slurries are formed in separate mixers, e.g., in the form of "pin mixers" or "pin-less mixers" as desired. As seen in flow diagrams B and C, if desired for efficiency, the mixer used for the concentrated layer can have a smaller mixing volume capacity in some embodiments since the amount of slurry needed to be applied for the concentrated layer is less than the amount of slurry that is applied to form the board core. The "main" mixer (i.e., for forming the board core slurry) comprises a main body and a discharge conduit (e.g., a gate-canister-boot arrangement as known in the art, or a modified outlet design (MOD) arrangement as described in U.S. Pat. Nos. 6,494,609 and 6,874,930). As seen in all three depictions A-C, foaming agent can be added in the discharge conduit of the mixer (e.g., in the gate as described, for example, in U.S. Pat. Nos. 5,683,635 and 6,494,609).

Diagram A illustrates an embodiment where the steps occur using one mixer, i.e., the main mixer 100. Stucco 102 and water 104 are inserted into the main mixer 100, while foam 106 is inserted downstream in the discharge conduit 108 which can include a modified outlet design or canister, meaning that foam is not inserted in the body of the main mixer 100. A portion of the slurry 110, which is essentially foamless, is diverted from the mixer 100 from an exit port, e.g., generally away from the discharge conduit 108 to form the concentrated layer slurry 112. The main mixer 100 acts as a pump to drive the unfoamed slurry 110 out the smaller discharge port for the concentrated layer slurry which flows through the pressurized slurry line. Additives, particularly, the enhancing additive, in wet form 114 are injected into the pressurized slurry line through injection ports. The inventors have found that the line is desirably long enough, which can be determined within the level of ordinary skill, to allow for uniform mixing of slurry including enhancing additive. There is no need for separate introduction of stucco or water. As seen in depiction A, edge slurry streams 116 and 118 can also be diverted from the main mixer 100 without foam so that they have the desired hardness for their use on the edges as known in the art.

In diagram B, it can be seen that the two mixers 200 and 202 are connected in series. Stucco 204 and water 206 are added to the main mixer 200. The foam 208 is added downstream of the body of the main mixer 200 in the discharge conduit 210 (which can contain a modified outlet design or canister). Thus, foamless slurry 212 can exit the mixer 200 through an exit port and inserted into the smaller secondary mixer 202 for the concentrated layer, where dry and wet additives 214 (e.g., via separate lines), including enhancing additive, can be separately added to provide the concentrated effect as desired. Edge slurry streams 214 and 216 are also shown as exiting from a port separate from the main discharge 210 to minimize foam therein and provide their desired hardness.

In diagram C, it can be seen that there are two mixers 300 and 302 but the slurries are made separately, with each mixer having its own inputs for stucco and water as desired. Particularly, stucco 304 and water 306 are added into the main mixer 300. Foam 308 is added downstream of the body of the main mixer 300 in the discharge conduit 310 (which can contain a canister or modified outlet design as described in U.S. Pat. Nos. 6,494,609 and 6,874,930). Edge slurry streams 312 and 314 can exit from a port separate from the main discharge 310 to minimize foam therein and provide their desired hardness. In a secondary mixer 302 for forming the concentrated layer slurry 316, stucco and water 318, 320 can be added and mixed. Dry and wet additives (e.g., via separate lines), including enhancing additive as described herein, can be inserted into the concentrated layer mixer 302. As such, the concentrated layer slurry 316 is prepared separately from the core slurry formed in the main mixer 300.

Figure 5:
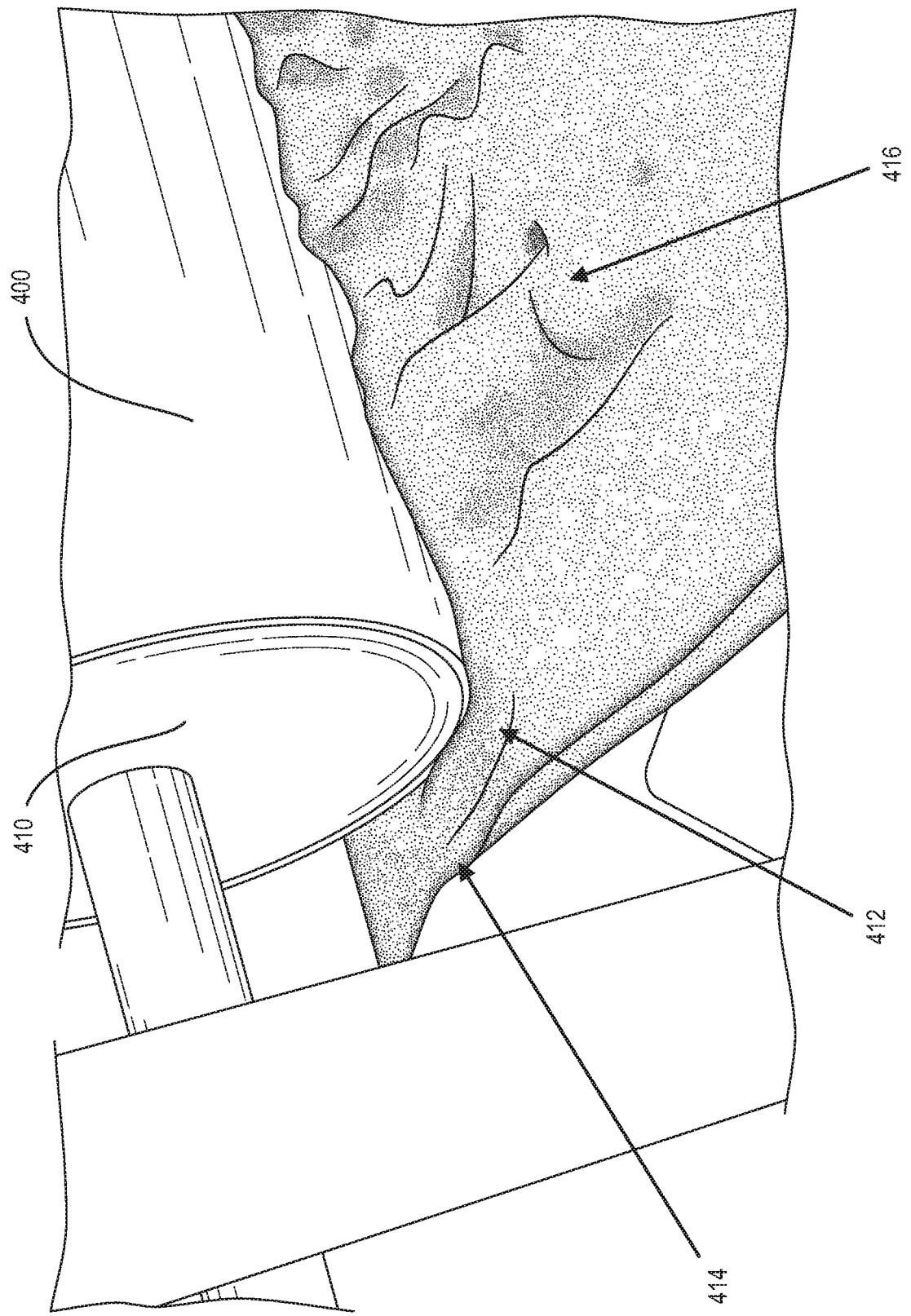
FIG. 5 is an illustration depicting the slurry forming an edge around the roller of the trial depicted in FIG. 3 as discussed in Example 3 herein, wherein the slurry is absent glass fiber.
Figure 6:
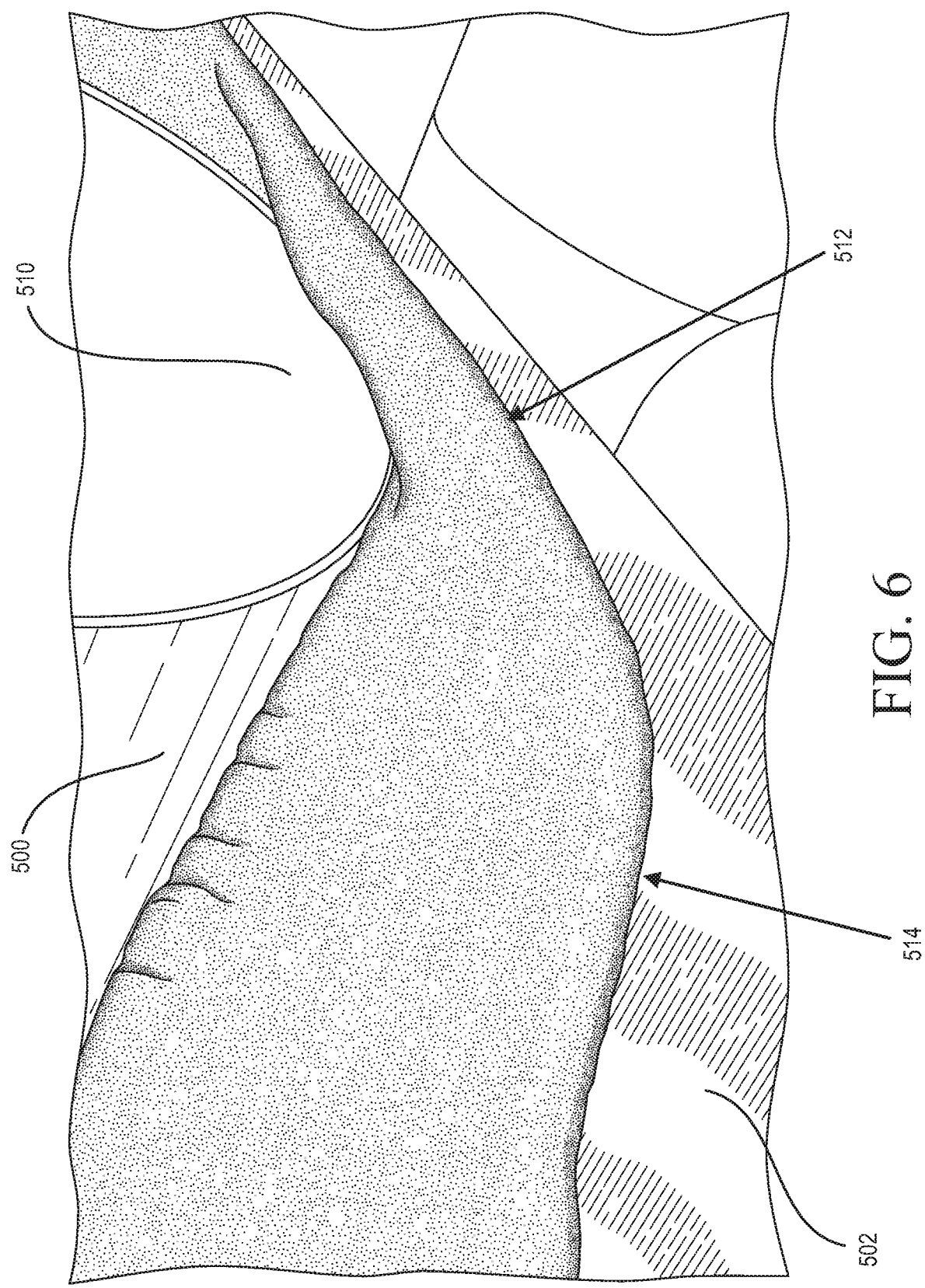
FIG. 6 is an illustration depicting the slurry forming an edge around the roller of the trial depicted in FIG. 4 as discussed in Example 3 herein, wherein the slurry contains glass fiber.

In some embodiments, the edge slurries can be extracted from the concentrated layer mixer, instead of from the main mixer, as desired. The edges can be denser than the board core in some embodiments and, e.g., can have the same density as the concentrated layer. For example, as the concentrated layer is laid down, a portion of the concentrated layer slurry can flow around the ends of the roller to form edges of the ultimate product, as seen in FIGS. 5 and 6 with respect to one end. The length of the roller can be configured (e.g., to be shorter than the width of the paper) to accommodate the formation of edges in this manner.

In some embodiments, it will be understood that the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1.

Board is formed in a sandwich structure, normally concurrently and continuously, as will be understood in the art. The face cover sheet travels as a continuous ribbon on a conveyor. After being discharged from its mixer, the concentrated layer slurry is applied to the moving face cover sheet. Also, hard edges, as known in the art, can be formed, e.g., from the same slurry stream forming the concentrated layer for convenience, if desired.

The board core slurry is then applied over the moving face paper bearing the concentrated layer slurry, and covered with a second cover sheet (typically the "back" cover sheet) to form a wet assembly in the form of a sandwich structure that is a board precursor to the final product. The back (bottom) cover sheet may optionally bear a skim coat, which can be formed from the same or different gypsum slurry as for the concentrated layer. The cover sheets may be formed from paper, fibrous mat or other type of material (e.g., foil, plastic, glass mat, non-woven material such as blend of cellulosic and inorganic filler, etc.). In some embodiments, the concentrated layer is applied on both major sides of the board, i.e., in bonding relation to both the top and bottom sheets.

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). Surprisingly and unexpectedly, it has been found that board prepared according to the disclosure requires significantly less time in a drying process because of the low water demand characteristic of the board arrangement and composition. This is advantageous because it reduce energy costs.

It also is common in the manufacture of gypsum board to use vibration in order to eliminate large voids or air pockets from the deposited slurry. Each of the above steps, as well as processes and equipment for performing such steps, are known in the art.

The following example(s) further illustrate the invention but, of course, should not be construed as in any way limiting its scope.

Example 1

This example demonstrates strength characteristics of different types of board samples in accordance with principles of the present disclosure.

In particular, three different boards were tested. Board 1 was a comparative board, absent a concentrated layer. Boards 2 and 3 were composite gypsum boards where each contained a concentrated layer and board core in accordance with principles of the disclosure. Each board was prepared at a thickness of about one-half inch with a composite density, not including the face and back paper, of about 26 pcf.

Each board was produced as a 6 inch by 6 inch laboratory sample following the general arrangement shown in FIG. 1. Each board contained a face paper having a basis weight of 48 lbs/MSF and a back paper having a basis weight of 42 lbs/MSF (MSF=1000 ft$^2$). The respective thickness and density for the concentrated layer (if present) and board core for each board is provided in Tables 1A and 1B.

The enhancing additive was a pregelatinized corn starch having a viscosity of 773 centipoise determined according to the VMA method. In Boards 2 and 3, it can be seen in Tables 1A and 1B that the enhancing additive was more concentrated in the concentrated layer than in the board core.

Nail pull resistance was tested in accordance with ASTM 473-10, Method B. The nail pull values are reported in Table 1C.

TABLE 1A

| | Concentrated Layer (CL) | | |
|---|---|---|---|
| Board ID | Density (pcf) | % Starch | Thickness (in) |
| Board 1 (comparative) | N/A | N/A | N/A |
| Board 2 | 30 | 20 | 0.035 |
| Board 3 | 30 | 20 | 0.050 |

TABLE 1B

| | Board Core Layer (BCL) | | |
|---|---|---|---|
| Board ID | Density (pcf) | % Starch | Thickness (in) |
| Board 1 (comparative) | 26.0 | 2 | 0.467 |
| Board 2 | 26.0 | 2 | 0.467 |
| Board 3 | 26.0 | 2 | 0.467 |

TABLE 1C

| Board ID | Composite (CL + BCL) Density (pcf) | Nail Pull (lbf) |
|---|---|---|
| Board 1 (comparative) | 26.0 | 60.2 |
| Board 2 | 26.3 | 70.9 |
| Board 3 | 26.4 | 76.3 |

As can be seen from Table 1C, the comparative sample (Board 1) had a low nail pull resistance value, whereas both of Composite Boards 2 and 3 exhibited improved nail pull resistance. Thus, this Example illustrates that an improved composite design in accordance with the present disclosure enhances nail pull resistance by incorporating a concentrated layer adjacent to the face paper. This concentrated layer contributes to the desirable nail pull resistance with a considerable thickness in accordance with principles of the present disclosure.

Example 2

This example demonstrates the effect of various starches on strength in gypsum disks representative of a concentrated layer. Each composition included the ingredients set forth in Table 2, although the type of starch varied as shown in Table 3. Particularly, composition 2A was a comparative composition inasmuch as it included no starch. Composition 2B included a cooked starch in the form of a pregelatinized starch having a viscosity of 80 cP, as measured according to the VMA Method, as set forth in US 2014/0113124 A1. Compositions 2C-2O included one of various uncooked starches as shown in Table 3.

TABLE 2

| Ingredients | Grams (g) | Wt. % (stucco basis) |
|---|---|---|
| Stucco | 300 | 100 |
| Heat Resistance Accelerator | 4.5 | 1.5 |
| Starch | 60 | 20 |
| Sodium Trimetaphosphate (10% solution) | 6 | 0.2 |
| Retarder (1% solution) | 18 | 0.06 |
| Dispersant | 0.3 | 0.1 |
| Water | 471 | 165 |
| Total: | 859.8 | — |

The disks were prepared from separate slurry compositions 2A-2O. In comparative composition 2A, the total weight was 799.8 g as there was no starch. Each composition was prepared from dry and wet mixes that were combined. Each wet mix was prepared by weighing the water, dispersant, retarder 1% solution, dispersant, and sodium trimetaphosphate 10% solution in a mixing bowl of a Waring blender (model CB15), commercially available from Conair Corp. (East Windsor, N.J.). The sodium trimetaphosphate 10% solution was prepared by dissolving 10 parts (weight) of sodium trimetaphosphate in 90 parts (weight) of water, while the retarder 1% solution was composed of an aqueous solution of the pentasodium salt of diethylenetriaminepentaacetic acid (Versenex™ 80, commercially available from DOW Chemical Company, Midland, Mich.), and prepared by mixing 1 part (weight) of Versenex™ 80 with 99 parts (weight) of water. The remaining ingredients, particularly, the stucco, heat resistant accelerator, and starch (if present), were weighed and prepared in a dry mix. The heat resistant accelerator was composed of ground up land plaster and dextrose. The dry mix was poured into the blender with the wet ingredients, and soaked for 5 seconds and then mixed at high speed for 15 seconds.

Foam was added in order to reduce disk density (and hence weight). For foam preparation, a 0.5% solution of Hyonic™ PFM-33 soap (available from GEO Specialty Chemicals, Ambler, Pa.) was formed and then mixed with air to make the air foam. The air foam was added to the slurry using a foam generator. The foam generator was operated at a rate sufficient to obtain a density of the final dried disk of 38 pcf.

After foam addition, the slurry was immediately poured into a ring (4" inside diameter and 0.5" thick) type of mold which was suited for forming a disk sample. The surface of the molds had previously been sprayed with lubricant in the form of WD40™, commercially available from WD-40 Company, San Diego, Calif. The slurry was poured to a point slightly above the top of the ring of the molds. The excess slurry was scraped as soon as the plaster was set. After the disks hardened in the mold, the disks were removed from the mold, and heated at 300° F. (149° C.) for 60 min, then dried at 110° F. (43° C.) for about 48 hours until a constant weight was reached. Following removal from the oven, the disks were allowed to cool at room temperature for one hour. The final disks had dimensions of a diameter of 4 inches (10.16 cm), and a thickness of 0.5 inches (1.27 cm).

Strength was tested by measuring compressive strength and nail pull resistance. The nail pull resistance was tested in accordance with ASTM 473-10, Method B. The compressive strength was measured using the materials testing system commercially available as SATEC™ E/M Systems from MTS Systems Corp. (Eden Prairie, Minn.). The load was applied continuously and without a shock at speed of 0.04 inch/min (with a constant rate between 15 to 40 psi/s). The results are shown in Table 3.

TABLE 3

| Composition | Starch | Product Name (Manufacturer) | Compressive Strength (psi) | Nail Pull (lb$_f$) |
|---|---|---|---|---|
| 2A | No Starch | N/A | 871 (6000 kPa) | 78 (350 N) |
| 2B | Pregelatinized corn flour | (Bunge North America, Illinois) | 1549 (10,680 kPa) | 161 (720 N) |
| 2C | A type wheat starch | Midsol 50(MGP Ingredients, Atchison, KS) | 1836 (12,660 kPa) | 161 (720 N) |
| 2D | A type wheat starch | Manildra | 1685 (11,620 kPa) | NA* |
| 2E | B type wheat starch | GemStar 50 (Manildra Milling Hamburg, Hamburg, IA) | 1603 (11,050 kPa) | 159 (710 N) |

TABLE 3-continued

| Composition | Starch | Product Name (Manufacturer) | Compressive Strength (psi) | Nail Pull (lb$_f$) |
|---|---|---|---|---|
| 2F | Corn starch | GPC Corn, Grain Processing Corporation "GPC," (Muscatine, IA) | 1306 (9,000 kPa) | NA |
| 2G | Hydroxypropylated starch | K96F (GPC) | 1093 (7,540 kPa) | NA |
| 2H | Hydroxypropylated starch | K500F (GPC) | 1571 (10,830 kPa) | NA |
| 2I | Waxy corn starch | Amioca (Ingredion, Inc., Westchester, IL) | 1664 (11,470 kPa) | 197 (880 N) |
| 2J | Regular corn starch | Melogel (Ingredion) | 1520 (10,480 kPa) | NA |
| 2K | High amylose corn starch | HylonV (Ingredion) | NA | 121 (540 N) |
| 2L | Pea starch | Tackidex N735 (Roquette America, Inc. Gurnee, IL,) | 752 (5,180 kPa) | NA |
| 2M | Acid modified corn starch | Clinton 277 (Archer Daniels Midland "ADM," Decatur, IL) | 1832 (12,630 kPa) | 215 (960 N) |
| 2N | Acid modified corn starch | Clinton 290 (ADM) | NA | 188 (840 N) |
| 2O | Hydroxypropylated starch | Clineo 714 (ADM) | 1330 (9,170 kPa) | 195 (870 N) |

*Values marked with "NA" indicate that the test was not run.

In embodiments where starches are used in the concentrated layer, this example illustrates that both cooked and uncooked starches have benefit as enhancing additive for improving strength as shown by the improvement in performance on strength. As seen from Table 3, the uncooked and cooked starches showed considerable improvement in strength over the comparative composition without the starch, with many of the values being more than about 50% higher than the strength of the control without starch, more than about 75% higher than the strength of the control without starch, or more than about 100% more than the strength of the control without starch.

The improvement in strength seen in the disks shown from both cooked and uncooked starches, in accordance with various embodiments of the invention, indicates the utility of these starches in the concentrated layer of a gypsum wallboard in accordance with some embodiments because the desired starches provides extra bonding between gypsum crystals for strength improvement. The starches were effective to improve strength, thereby suggesting lack of migration, contrary to the case with a migratory acid-modified starch. Therefore, the example shows that the starches would be effective in a concentrated layer.

Example 3

This example demonstrates the optional use of fibers in the concentrated layer. In particular, two types of slurries were prepared. Each slurry was then used to form a concentrated layer in separate production boards prepared and trailed on the wet end of a manufacturing line. One type of slurry (composition 3A) did not contain any fiber, while the other type of slurry (composition 3B) contained glass fiber having a fiber length of 0.5 inch (25,400 μm) and diameter of 15.24-16.51 μm, thereby having an aspect ratio of about 1540 to about 1670 (length divided by diameter). The glass fiber was in the form of DuraCore™ SF+1/2M300 pre-chopped strands, commercially available from Johns Manville Inc., (Denver, Colo.).

A general representative range of formulation for illustrative purposes only for the concentrated layer is provided in Table 4, where low and high columns are provided to indicate an example of desired ranges of ingredients therebetween (inclusive) in accordance with an embodiment. Other representative formulations and embodiments will be easily ascertained from the full description herein, including the ranges for ingredients provided. The trailed formulations are provided in Tables 5A and 5B. Aside from the differences in glass fiber, the two formulations were the same, as can be seen in Tables 5A and 5B.

TABLE 4

| | Low (lbs/MSF) | High (lbs/MSF) |
|---|---|---|
| Stucco | 40 | 200 |
| Ingredient | Low wt. % (stucco basis) | High wt. % (stucco basis) |
| Heat Resistant Accelerator | 0.3% | 5.0% |
| Pregelatinized Starch | 5.0% | 60.0% |
| Dispersant | 0.0% | 2.5% |
| Sodium Trimetaphosphate | 0.001% | 0.38% |
| Retarder | 0.013% | 0.250% |
| Alum | 0.00% | 0.38% |
| Fiberglass | 0.13% | 2.50% |
| | Dry Density (pcf) | Dry Density (pcf) |
| Density | 25 | 65 |

TABLE 5A

Composition 3A

| Ingredient | Weight (lbs/MSF) | Wt. % |
|---|---|---|
| Stucco | 84 | 39.96 |
| Heat Resistant Accelerator | 1.88 | 0.89 |
| Pregelatinized Starch | 18 | 8.56 |
| Sodium Trimetaphosphate | 0.1768 | 0.08 |
| Retarder | 0.02 | 0.01 |
| Dispersant | 0.08 | 0.04 |
| Water | 106 | 50.43 |
| Glass fiber | 0 | 0 |
| Total: | 210.1568 | 99.97 |

TABLE 5B

Composition 3B

| Ingredients | Weight (lbs/MSF) | Wt. % |
|---|---|---|
| Stucco | 84 | 39.96 |
| Heat Resistant Accelerator | 1.88 | 0.89 |
| Pregelatinized Starch | 18 | 8.56 |
| Sodium Trimetaphosphate | 0.1768 | 0.08 |
| Retarder | 0.02 | 0.01 |
| Dispersant | 0.08 | 0.04 |
| Water | 106 | 50.43 |
| Glass Fiber | 0.2 | 0.10 |
| Total: | 210.3568 | 100.07 |

The heat resistant accelerator was composed of ground land plaster and dextrose. Each slurry composition was prepared from dry and wet ingredients that were combined in a secondary mixer dedicated for the concentrated layer, separate from the main mixer for preparing the core. The sodium trimetaphosphate, retarder, and dispersant were added in liquid form. The retarder was in the form of pentasodium salt of diethylenetriamninepentaacetic acid (Versenex™ 80, commercially available from DOW Chemical Company, Midland, Mich.). The dispersant was in the form of a poly naphthalene sulfonate calcium salt (DU-RASAR™ commercially from Ruetgers Polymers, Candiac, Canada). Alum can optionally be included to modify the gypsum hydration rate, if desired.

Foam was included in the concentrated layer, and the density of the concentrated layer produced from both slurries was 36 pcf on a dry basis. For foam preparation, a solution of a mixture of STEOL™ CS230 and Polystep 25 foaming agents (available from Stepan Co., Northfield, Ill.) was formed and then mixed with air to make the air foam using a foam generator. The air foam was added to the slurry at the secondary mixer. The amount of foam added was 1% by weight foaming agent. The foaming agent (1% solution) was prepared by dissolving 1 parts (weight) of foaming agent in 100 parts (weight) of water.

In order to prepare trial board on a manufacturing line, paper was released on a continuous roll onto a conveyor as commonly known in the art. The concentrated layer slurry was discharged from the secondary mixer and laid on the paper as it traveled along the conveyor at high speed (over 600 feet/min). A driven roller was positioned transverse to the paper and was used to spread the concentrated slurry across the paper. The roller typically rotates in the direction opposite the direction the paper travels. The length of the roller was slightly less than the width of the paper so that the slurry was allowed to travel around the ends of the roller over the edges of the paper to ultimately form the edges of the finished board product. The roller normally works with a second roller under the paper with a sufficient gap between the rollers to permit the thickness of the paper to travel therebetween.

As the roller obstructs the forward progress of the slurry, a slurry head forms behind, and just upstream, from the roller, controlled primarily by tangential speed of the rotating roller. The head is an inventory of slurry that helps decelerate the incoming material, providing spread, which allows for proper amount of slurry to form the concentrated layer and the edges. The slurry is wiped from the head and carried by the roller to the downstream side of the roller and re-deposited on the paper and spread to lay what becomes the concentrated layer of the board. Optionally, a laser can be used to control the head in order to regulate the volume of slurry by varying the amount of soap or foam air used which then changes the density of slurry contained within the head, as known in the art. Downstream, the core slurry is deposited from the main mixer over the concentrated layer and the board process is completed using understood techniques.

Figure 3:
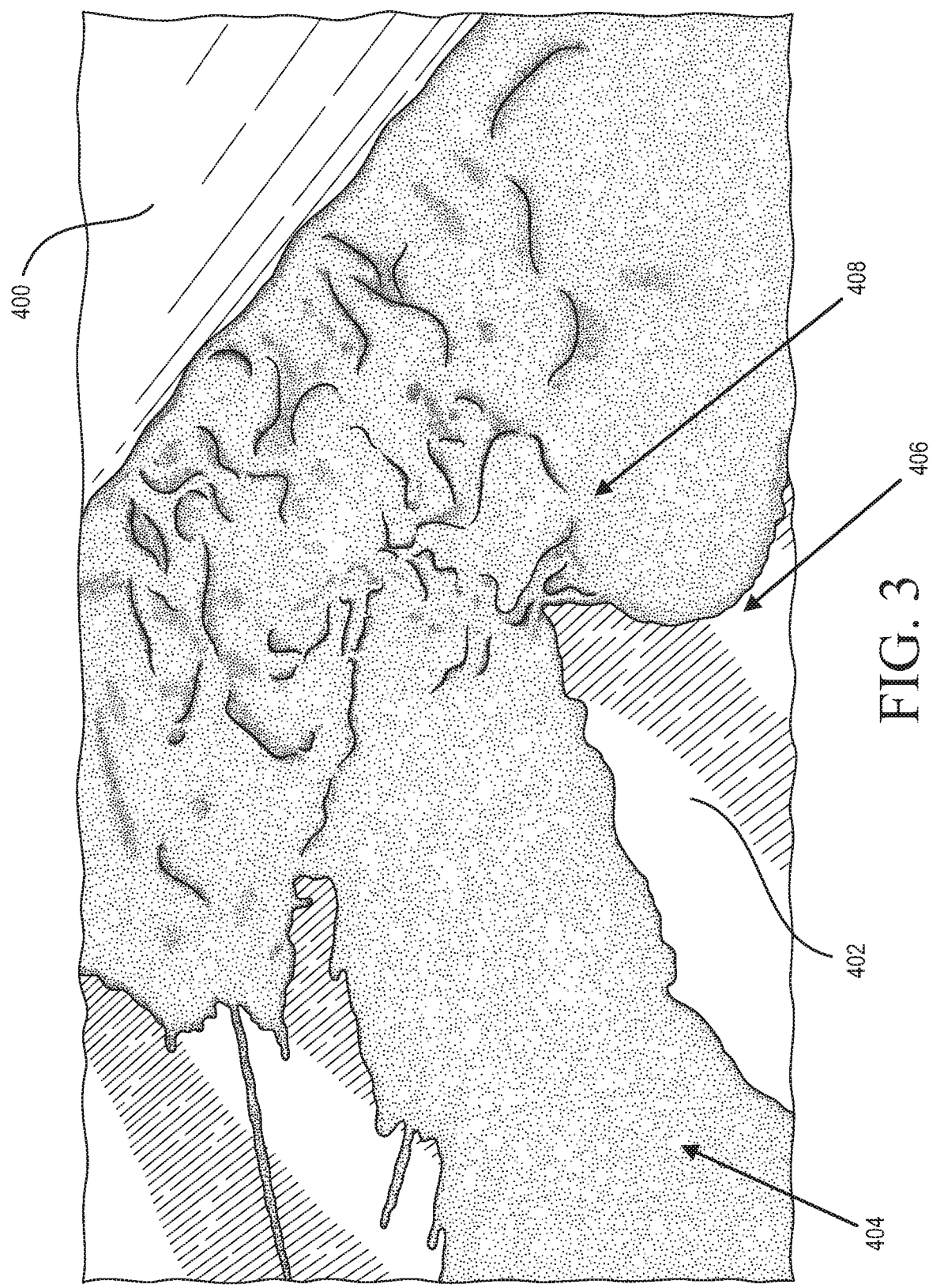
FIG. 3 is an illustration depicting a slurry head upstream of a roller used in forming a concentrated layer on a manufacturing line for gypsum wallboard in a trial as discussed in Example 3 herein, wherein the slurry is absent glass fiber.
Figure 4:
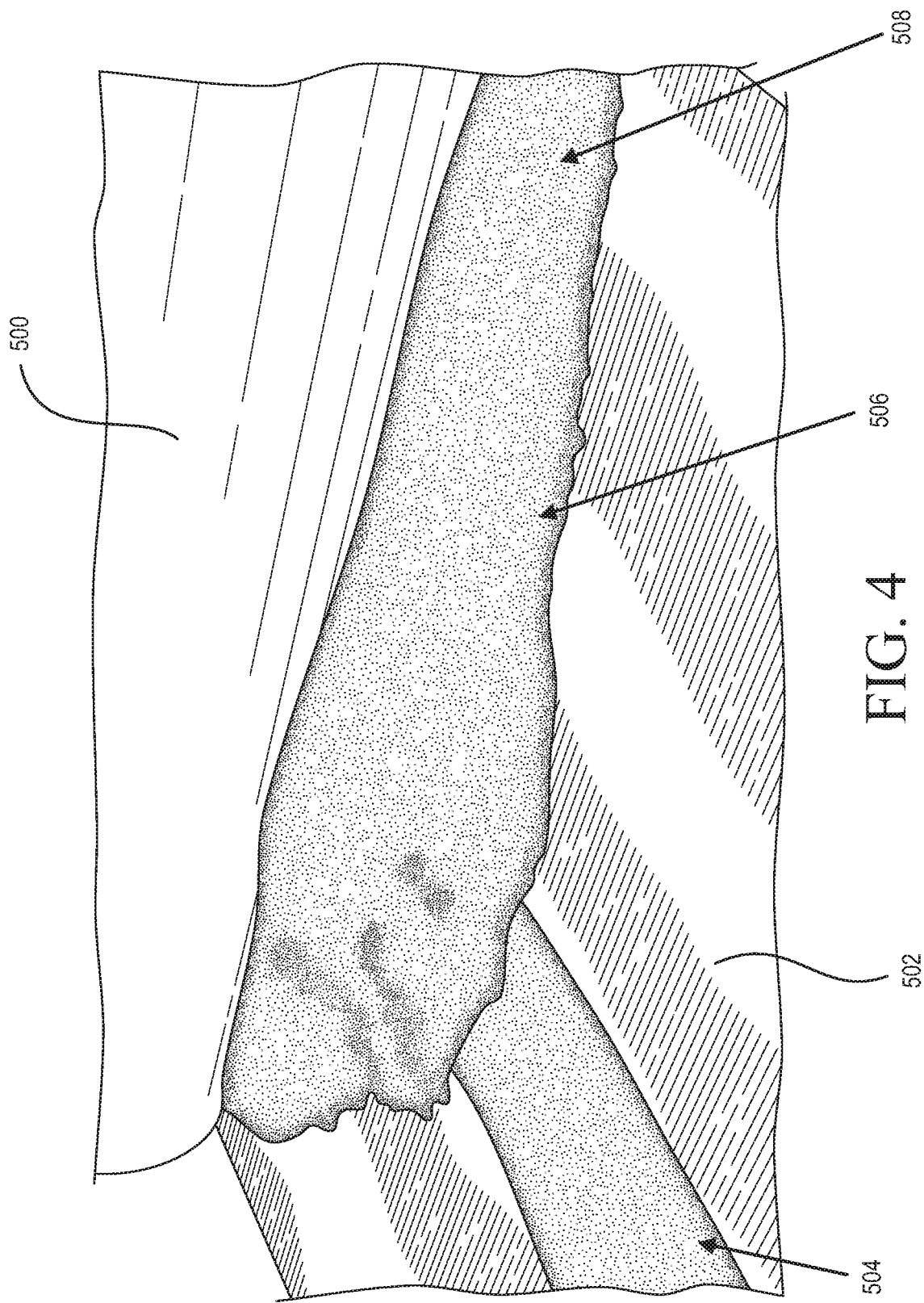
FIG. 4 is an illustration depicting a slurry head upstream of a roller used in forming a concentrated layer on a manufacturing line for gypsum wallboard in a trial as discussed in Example 3 herein, wherein the slurry contains glass fiber.

FIGS. 3-6 illustrate images depicting the slurry head (FIGS. 3-4) and the formation of an edge around the roller (FIGS. 5-6) from the manufacturing trials using the slurries without the glass fiber (composition 3A; FIGS. 3 and 5), and with optional glass fiber (composition 3B; FIGS. 4 and 6). The same trial run using composition 3A was carried out to illustrate the conditions shown in FIGS. 3 and 5, while the same trial run using composition 3B was carried out to illustrate the conditions shown in FIGS. 4 and 6.

As seen in FIGS. 3-4, the concentrated layer slurry was applied by a roller 400 or 500 to a paper cover sheet 402 or 502. The slurry without glass fiber shown in FIG. 3 was deposited on paper 402 upstream of roller 400 and the deposited slurry traveled toward the roller 400 in a line of slurry 404 that was choppy and uneven. The slurry without glass fiber resulted in a more scalloped slurry head 406, with hydrodynamic instability 408 resulting in undesired air entertainment. On the other hand, the slurry with glass fiber shown in FIG. 4 was deposited on paper 502 upstream of roller 500 and the deposited slurry traveled in a line of slurry 504 that was stable and calmer. The slurry with glass fiber resulted in less scalloping and a more even, smooth head 506 with a more stable slurry 508 as a result of a change in rheological properties. The head 406 containing scalloping tends to create unstable flow dynamics in various length and time scales and thereby can result in defects such as voids, blisters, or paper delamination once the product is kiln dried.

FIG. 5 corresponds with the trial shown in FIG. 3, and FIG. 6 corresponds with the trial shown in FIG. 4. Particularly, FIGS. 5-6 show an edge 410 or 510 of the roller 400 or 500. An edge slurry 412 or 512 is formed around the edge 410 or 510 of the roller 400 or 500 to ultimately form an edge of the board to be produced. The slurry without glass fiber resulted in a more variable edge which can cause voids, blisters, paper delamination, soft and/or hard edges, and general disruption to the edge formation and manufacturing process, as seen in FIG. 5. As seen in FIG. 5, there is undesirable splashing 414 of the edge slurry over an edge of the paper 402. Due to flow variation, wave 416 formation can occur as the slurry is partially lifted onto the roller 400, such that as wave 416 reaches the edge, splashing is undesirably caused. As seen in FIG. 6, the slurry edge 512 is more controlled and does not splash over the paper 502. The slurry with glass fiber had less edge variation, resulting in better control, reducing the opportunity for defects such as voids, blisters, paper delamination, soft and/or hard edges, and other disruptions to the manufacturing process, as seen in FIG. 6.

It will be appreciated that fiber such as glass fiber is not required in the concentrated layer. Defects including blisters, voids, delamination, poor edges, etc., can be controlled by other means, including by a variety of mechanical or other means well known in the art. For example, mechanical vibrators can be used under the conveyor to remove large air pockets in the slurry. In addition, other mechanical or other process adjustments will be appreciated, including the use of slurry spreaders, slurry distributors, head control means, and adjustments to mixer discharge, line speed, and formulation viscosity, etc. These examples of mechanical and other techniques can be used alone or in combination with glass to provide acceptable results.

Examples 4-10

In the following Examples 4-10, slurry compositions were prepared as follows. Each slurry composition was prepared from dry and wet ingredients that were combined in a mixer (i.e., a main mixer for the core slurries, and a secondary mixer dedicated for the concentrated layer slurries). The water, sodium trimetaphosphate, retarder, dispersant, and alum were added in liquid form. The retarder was in the form of pentasodium salt of diethylenetriaminepentaacetic acid (Versenex™ 80, commercially available from DOW Chemical Company, Midland, Mich.). The dispersant was in the form of a poly naphthalene sulfonate calcium salt (DU-RASAR™ commercially from Ruetgers Polymers, Candiac, Canada). The stucco, heat resistant accelerator, glass fiber, and dextrose were added in solid form. Alum was optionally included to modify the gypsum hydration rate, if desired. The heat resistant accelerator was composed of ground land-plaster and dextrose. Additional dextrose was added in some instances to improve bonding with the back (newsline) paper cover sheet.

Foam was included in the core slurries and concentrated layer slurries. For foam preparation, a solution of a mixture of STEOL™ CS230 and Polystep 25 foaming agent (available from Stepan Co., Northfield, Ill.) was formed and then mixed with air to make the air foam using a foam generator. The air foam density was approximately 4.5 lbs per cubic foot. The air foam was added to core slurry in a discharge conduit of the main mixer and added to the concentrated slurry at the secondary mixer. The weight percentage of a specific ingredient is based on its own weight, versus the total composition of the wet slurry (thus, excluding paper). Any inconsistencies in the totals are due to rounding of values of individual ingredients, e.g., due to effective limits of readings from equipment such as pumps and flow meters, as will be understood by those skilled in the art.

Example 4

This example demonstrates a benefit of including a concentrated layer in gypsum board. The example shows that the concentrated layer enhances nail pull performance. Two boards were prepared, Board 4A and Board 4B. Board 4A did not contain a concentrated layer, Board 4B did. The slurry compositions for preparing boards 4A and 4B are set forth in Tables 6 and 7, respectively.

TABLE 6

Composition for Board 4A

| | Core | | Concentrated Layer | |
|---|---|---|---|---|
| Ingredient | Weight (lbs/MSF) | Wt. % | Weight (lbs/MSF) | Wt. % |
| Stucco | 996 | 52.75% | N/A | N/A |
| Heat Resistant Accelerator | 17.5 | 0.93% | N/A | N/A |
| Foaming Agent | 0.78 | 0.04% | N/A | N/A |
| Pregelatinized Starch | 15 | 0.79% | N/A | N/A |
| Sodium Trimetaphosphate | 1.07 | 0.06% | N/A | N/A |
| Retarder | 0.46 | 0.02% | N/A | N/A |
| Dispersant | 0.8 | 0.04% | N/A | N/A |
| Alum | 0.8 | 0.04% | N/A | N/A |
| Glass fiber | 0 | 0.00% | N/A | N/A |
| Dextrose | 1 | 0.05% | N/A | N/A |
| Water | 854.8 | 45.27% | N/A | N/A |
| Total: | 1888 | 100% | N/A | N/A |

TABLE 7

Composition for Board 4B

| | Core | | Concentrated Layer | |
|---|---|---|---|---|
| Ingredients | Weight (lbs/MSF) | Wt. % | Weight (lbs/MSF) | Wt. % |
| Stucco | 896.3 | 54% | 99.7 | 41% |
| Heat Resistant Accelerator | 17.5 | 1% | 1.95 | 1% |
| Foaming Agent | 0.78 | 0.05% | 0.04 | 0.02% |
| Pregelatinized Starch | 13.5 | 1% | 14.5 | 6% |
| Sodium Trimetaphosphate | 1.07 | 0.06% | 0.10 | 0.04% |
| Retarder | 0.46 | 0.03% | 0.04 | 0.01% |
| Dispersant | 0.8 | 0.05% | 0.16 | 0.07% |
| Alum | 0.8 | 0.05% | 0.04 | 0.01% |
| Glass Fiber | 0 | 0% | 0 | 0% |
| Dextrose | 1 | 0.06% | 0.11 | 0.05% |
| Water | 729.7 | 44% | 125.1 | 52% |
| Total: | 1662 | 100% | 242 | 100% |

Boards 4A and 4B were each prepared on a high speed (over 600 ft/min) board manufacturing line (machine) using a main pin mixer to combine wet and dry ingredients in a continuous process to form a continuous ribbon of board precursor, with a core slurry deposited between two sheets of paper, as described in Example 3. The concentrated layer was used in preparing Board 4B with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final Boards, 4A and 4B. Properties and dimensions of the boards are set forth in Table 8.

TABLE 8

| Board | Overall Board Details | | | Concentrated Layer Details | |
|---|---|---|---|---|---|
| | Board Thickness (in) | Board Weight (lbs/MSF) | Nail Pull Result (lbs force) | Formulated Thickness (in) | Dry Density (pcf) |
| Board 4A | 0.5 | 1290 | 82.8 | N/A | N/A |
| Board 4B | 0.5 | 1289 | 86.9 | 0.025 | 39.4 |

This example shows a benefit of the concentrated layer in enhancing strength of the board product. As seen in Table 8, Board 4B, which included the concentrated layer, resulted in an increased nail pull (resistance) value. It will be understood that the term "nail pull" herein refers to nail pull resistance as measured according to ASTM 473-10 Method B, unless otherwise stated. Such nail pull improvement is beneficial in providing strength and enhancing performance in the field of the board. Advantageously, increasing nail pull with the aid of concentrated layer can be used to reduce board weight and the cost of manufacturing wallboard products.

Example 5

This example demonstrates a benefit of using a concentrated layer in gypsum board. In particular, tailoring ingredients in the slurry for forming the concentrated layer can be beneficial. The rate in which a concentrated layer stiffens can be optionally modulated to effect the washout of the concentrated layer as the main (core) slurry meets the concentrated layer slurry during the board manufacturing process. Washout refers to the removal of the concentrated layer which can occur when the core slurry is distributed over the concentrated layer during the continuous manufacturing process. Washout undesirably can result in product non-uniformity and reduced nail pull. Two boards were prepared, Boards 5A and 5B. The compositions for preparing Boards 5A and 5B are set forth in Tables 9 and 10, respectively.

The stiffening rate of stucco slurry (sometimes called gypsum slurry) in this example was modified using alum and retarder. The amount of alum was decreased in Board 5B to decrease the rate of setting, while retarder was added to Board 5B to also decrease the rate of setting.

TABLE 9

Composition for Board 5A

| Ingredient | Core | | Concentrated Layer | |
|---|---|---|---|---|
| | Weight (lbs/MSF) | Wt. % | Weight (lbs/MSF) | Wt. % |
| Stucco | 795 | 55% | 84.6 | 38.06% |
| Heat Resistant Accelerator | 18.6 | 1% | 1.86 | 0.84% |
| Foaming Agent | 0.93 | 0.06% | 0.046 | 0.02% |
| Pregelatinized Starch | 18 | 1.25% | 20 | 9.00% |
| Sodium Trimetaphosphate | 2.14 | 0.15% | 0.18 | 0.08% |
| Retarder | 0.48 | 0.03% | 0.02 | 0.01% |
| Dispersant | 2.2 | 0.15% | 0.08 | 0.04% |
| Alum | 0.8 | 0.06% | 0.06 | 0.03% |
| Glass fiber | 0 | 0% | 0 | 0.00% |
| Dextrose | 1.2 | 0.08% | 0.12 | 0.05% |
| Water | 601 | 42% | 115.3 | 51.87% |
| Total: | 1440 | 100% | 222 | 100% |

TABLE 10

Composition for Board 5B

| Ingredients | Core | | Concentrated Layer | |
|---|---|---|---|---|
| | Weight (lbs/MSF) | Wt. % | Weight (lbs/MSF) | Wt. % |
| Stucco | 795 | 55% | 84.6 | 38% |
| Heat Resistant Accelerator | 18.6 | 1.29% | 1.86 | 0.84% |
| Foaming Agent | 0.93 | 0.06% | 0.046 | 0.02% |
| Pregelatinized Starch | 18 | 1.25% | 20 | 9.00% |
| Sodium Trimetaphosphate | 2.14 | 0.15% | 0.18 | 0.08% |
| Retarder | 0.48 | 0.03% | 0.03 | 0.01% |
| Dispersant | 2.2 | 0.15% | 0.08 | 0.04% |
| Alum | 0.8 | 0.06% | 0.04 | 0.02% |
| Glass Fiber | 0 | 0.00% | 0 | 0.00% |
| Dextrose | 1.2 | 0.08% | 0.12 | 0.05% |
| Water | 601 | 41.73% | 115.3 | 52% |
| Total: | 1440 | 100% | 222 | 100% |

Boards 5A and Mix 5B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 5A and 5B with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final boards 5A and 5B. Properties and dimensions of the boards are set forth in Table 11.

Washout was measured utilizing a density profilimeter machine which utilizes X-Ray technology (i.e., QDP-01X Density Profiler, commercially available from Quintek Measurement Systems, Inc., Knoxville, Tenn.) to determine the density gradient throughout the sample. One inch samples taken from Boards 5A and 5B were prepared and cut in the cross direction of the board so a density profile could be assembled to represent the entire width and thickness of each board.

TABLE 11

| Board | Overall Board Details | | | Concentrated Layer Details | |
|---|---|---|---|---|---|
| | Board Thickness (in) | Board Weight (lbs/MSF) | Washout (in) | Formulated Thickness (in) | Stiffening Rate (seconds) |
| Board 5A | 0.5 | 1117 | 0.01 | 0.025 | 15-17 |
| Board 5B | 0.5 | 1134 | 0.02 | 0.025 | 28-32 |

This example shows a benefit of using a concentrated layer, as both Boards 5A and 5B were effective. Board 5A was more preferred because it exhibited less washout. Reducing the stiffening rate led to more preferred board. As seen in Table 11, Board 5A demonstrated an increased ability to resist washout from the main slurry from contacting the concentrated layer during the manufacturing process as compared with Board 5B. In this regard, Board 5A differed from Board 5B in that Board 5A was prepared using less retarder and more alum resulting in less washout, while Board 5B was prepared using more retarder but included less alum. The results shown in Table 11 indicate a 50% reduction in washout for Board 5A as compared with Board 5B, although both boards were useful products.

Example 6

This example demonstrates a benefit of including a concentrated layer in a gypsum board. Particularly, the slurry composition for forming the concentrated layer can be tailored to include enhancing additives. As this example shows, starch concentration can be used to decrease the washout of the concentrated layer as the main (core) slurry meets the concentrated layer slurry during the board manufacturing process. Two boards were prepared, Boards 6A and 6B. The slurry compositions for preparing Boards 6A and 6B are set forth in Tables 12 and 13, respectively.

TABLE 12

Composition for Board 6A

| Ingredient | Core Weight (lbs/MSF) | Wt. % | Concentrated Layer Weight (lbs/MSF) | Wt. % |
|---|---|---|---|---|
| Stucco | 795 | 55.1% | 84.6 | 38.1% |
| Heat Resistant Accelerator | 18.6 | 1.29% | 1.86 | 0.84% |
| Foaming Agent | 0.93 | 0.06% | 0.046 | 0.02% |
| Pregelatinized Starch | 18 | 1.4% | 20 | 9.0% |
| Sodium Trimetaphosphate | 2.14 | 0.15% | 0.18 | 0.08% |
| Retarder | 0.48 | 0.03% | 0.03 | 0.01% |
| Dispersant | 2.2 | 0.15% | 0.08 | 0.04% |
| Alum | 0.8 | 0.06% | 0.04 | 0.02% |
| Glass fiber | 0 | 0% | 0 | 0.00% |
| Dextrose | 1.2 | 0.08% | 0.12 | 0.05% |
| Water | 601 | 41.7% | 115.3 | 51.9% |
| Total: | 1440 | 100% | 222.3 | 100% |

TABLE 13

Composition for Board 6B

| Ingredients | Core Weight (lbs/MSF) | Wt. % | Concentrated Layer Weight (lbs/MSF) | Wt. % |
|---|---|---|---|---|
| Stucco | 795 | 55.2% | 84.6 | 36.2% |
| Heat Resistant Accelerator | 18.6 | 1.29% | 1.86 | 0.8% |
| Foaming Agent | 0.93 | 0.06% | 0.046 | 0.02% |
| Pregelatinized Starch | 18 | 1.25% | 26 | 11.1% |
| Sodium Trimetaphosphate | 2.14 | 0.15% | 0.18 | 0.08% |
| Retarder | 0.48 | 0.03% | 0.03 | 0.01% |
| Dispersant | 2.2 | 0.15% | 0.08 | 0.03% |
| Alum | 0.8 | 0.06% | 0.04 | 0.02% |
| Glass Fiber | 0.000 | 0.00% | 0.0 | 0.00% |
| Dextrose | 1.2 | 0.08% | 0.12 | 0.05% |
| Water | 601 | 41.7% | 121 | 52% |
| Total: | 1440 | 100% | 234 | 100% |

Boards 6A and 6B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 6A and 6B with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final Boards, 6A and 6B. Properties of the boards are set forth in Table 14. Washout was measured as described in Example 5.

TABLE 14

| Board | Overall Board Details | | | Concentrated Layer Details | |
|---|---|---|---|---|---|
| | Board Thickness (in) | Board Weight (lbs/MSF) | Washout (in) | Formulated Thickness (in) | Stiffening Rate (seconds) |
| Board 6A | 0.5 | 1134 | 0.02 | 0.025 | 28-32 |
| Board 6B | 0.5 | 1145 | 0.005 | 0.025 | 28-32 |

This example illustrates a benefit of having a concentrated layer. Particularly, it can be seen that having a higher concentration of pregelatinized starch in the concentrated layer slurry, as compared with the core slurry, was beneficial. As seen in Table 14, Board 6A demonstrated more washout as compared with Board 6B. In this regard, Board 6A differed from Board 6B in that Board 6A was prepared using less pregelatinized starch, resulting in more washout, while Board 6B included more pregelantinized starch in the slurry. The results shown in Table 14 indicate washout was reduced by 75% in Board 6B as compared with Board 6A. Use of more enhancing additive, e.g., pregelatinized starch, in the concentrated layer can be less costly and more efficient as the additive is more highly located where the most benefit is seen, i.e., in the concentrated layer.

Example 7

This example demonstrates a benefit of including a concentrated layer in a gypsum board. In particular, it is shown that density of a concentrated layer can be used to improve nail pull. Density was modified by changing the amount of foam contained in the concentrated layer. Two boards were prepared, Boards 7A and 7B. The slurry compositions for preparing Boards 7A and 7B are set forth in Tables 15 and 16, respectively.

TABLE 15

Composition for Board 7A

| | Core | | Concentrated Layer | |
|---|---|---|---|---|
| Ingredient | Weight (lbs/MSF) | Wt. % | Weight (lbs/MSF) | Wt. % |
| Stucco | 789 | 55% | 85 | 38.7% |
| Heat Resistant Accelerator | 20.5 | 1.42% | 2.05 | 0.93% |
| Foaming Agent | 0.92 | 0.06% | 0.092 | 0.04% |
| Pregelatinized Starch | 18 | 1.24% | 18 | 8.2% |
| Sodium Trimetaphosphate | 2.14 | 0.15% | 0.18 | 0.08% |
| Retarder | 0.48 | 0.03% | 0.02 | 0.01% |
| Dispersant | 2 | 0.14% | 0.08 | 0.04% |
| Alum | 0.8 | 0.06% | 0.045 | 0.045% |
| Glass fiber | 2 | 0.14% | 0.2 | 0.09% |
| Dextrose | 1.2 | 0.08% | 0.12 | 0.05% |
| Water | 609 | 42.12% | 113.7 | 51.8% |
| Total: | 1446 | 100% | 219.5 | 100% |

TABLE 16

Composition for Board 7B

| | Core | | Concentrated Layer | |
|---|---|---|---|---|
| Ingredients | Weight (lbs/MSF) | Wt. % | Weight (lbs/MSF) | Wt. % |
| Stucco | 789 | 55% | 85 | 39% |
| Heat Resistant Accelerator | 20.5 | 1.42% | 2.05 | 0.93% |
| Foaming Agent | 0.915 | 0.06% | 0.046 | 0.02% |
| Pregelatinized Starch | 18 | 1.24% | 18 | 8.20% |
| Sodium Trimetaphosphate | 2.14 | 0.15% | 0.18 | 0.08% |
| Retarder | 0.48 | 0.03% | 0.02 | 0.01% |
| Dispersant | 2 | 0.14% | 0.08 | 0.04% |
| Alum | 0.8 | 0.06% | 0.045 | 0.02% |
| Glass Fiber | 2 | 0.14% | 0.2 | 0.09% |
| Dextrose | 1.2 | 0.08% | 0.12 | 0.05% |
| Water | 610.6 | 42.18% | 113.7 | 52% |
| Total: | 1448 | 100% | 219 | 100% |

Boards 7A and 7B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 7A and 7B with the aid of a secondary board mixer to blend wet and dry ingredients. This concentrated layer slurry was applied to the face paper using an application roller, with the core slurry deposited thereon from a discharge from the main mixer. The precursors were processed and kiln dried to form the final boards 7A and 7B. Properties and dimensions of the boards are set forth in Table 17.

TABLE 17

| | Overall Board Details | | | Concentrated Layer Details | |
|---|---|---|---|---|---|
| Board | Board Thickness (in) | Board Weight (lbs/MSF) | Nail Pull Result (lbs force) | Formulated Thickness (in) | Wet Density (pcf) |
| Board 7A | 0.5 | 1094 | 66.1 | 0.025 | 69 |
| Board 7B | 0.5 | 1084 | 68.3 | 0.025 | 75 |

This example shows benefit and efficiency of using a concentrated layer. Focusing strength additive and density in the concentrated layer provides an overall strength benefit efficiently. Both boards exhibited effective nail pull. As seen in Table 17, Board 7A demonstrated decreased nail pull as compared with Board 7B. In this regard, Board 7A differed from Board 7B in that Board 7A was prepared using more foaming agent in the concentrated layer slurry, resulting in lower density, while Board 7B included less foam in the concentrated layer slurry, resulting in higher density. But the results were similar as Board 7B was prepared with a higher weight percentage of starch. The results shown in Table 17 indicate that concentrating increased density in the concentrated layer and increasing enhancing additive dosage (by weight percentage) in the concentrated layer slurry are effective at increasing nail pull in an efficient manner.

Example 8

This example demonstrates a benefit of including a concentrated layer in gypsum board. Starch concentration in the concentrated layer can be used to improve nail pull. Two boards were prepared, Boards 8A and 8B. In this instance, since washout was more prevalent under test conditions, the nail pull difference was measured along the machine direction side of the board (the non-code side) where washout was not prevalent. The slurry compositions for preparing Boards 8A and 8B are set forth in Tables 18 and 19, respectively.

TABLE 18

Composition for Board 8A

| | Core | | Concentrated Layer | |
|---|---|---|---|---|
| Ingredient | Weight (lbs/MSF) | Wt. % | Weight (lbs/MSF) | Wt. % |
| Stucco | 794 | 55% | 94 | 38.02% |
| Heat Resistant Accelerator | 20.8 | 1.45% | 2.08 | 0.84% |
| Foaming Agent | 0.96 | 0.07% | 0.048 | 0.02% |
| Pregelatinized Starch | 18 | 1.26% | 20 | 8.1% |
| Sodium Trimetaphosphate | 2.14 | 0.15% | 0.18 | 0.73% |
| Retarder | 0.48 | 0.03% | 0.02 | 0.01% |
| Dispersant | 2.2 | 0.15% | 0.09 | 0.04% |
| Alum | 1 | 0.07% | 0.07 | 0.03% |
| Glass fiber | 0 | 0.00% | 0 | 0.00% |
| Dextrose | 1.5 | 0.10% | 0.15 | 0.06% |
| Water | 590.8 | 41.26% | 129 | 52.2% |
| Total: | 1432 | 100% | 247 | 100% |

TABLE 19

Composition for Board 8B

| Ingredients | Core Weight (lbs/MSF) | Wt. % | Concentrated Layer Weight (lbs/MSF) | Wt. % |
|---|---|---|---|---|
| Stucco | 794 | 55% | 94 | 34.7% |
| Heat Resistant Accelerator | 20.8 | 1.45% | 2.08 | 0.77% |
| Foaming Agent | 0.96 | 0.07% | 0.048 | 0.02% |
| Pregelatinized Starch | 18 | 1.26% | 26 | 9.61% |
| Sodium Trimetaphosphate | 2.14 | 0.15% | 0.18 | 0.07% |
| Retarder | 0.48 | 0.03% | 0.02 | 0.01% |
| Dispersant | 2.2 | 0.15% | 0.09 | 0.03% |
| Alum | 1 | 0.07% | 0.07 | 0.03% |
| Glass Fiber | 0 | 0.00% | 0.0 | 0.00% |
| Dextrose | 1.5 | 0.10% | 0.15 | 0.06% |
| Water | 590.8 | 41.26% | 148 | 54.7% |
| Total: | 1432 | 100% | 271 | 100% |

Boards 5A and 8B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 8A and 8B with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final Boards, 8A and 8B. Properties and dimensions of the boards are set forth in Table 20.

TABLE 20

| Board | Overall Board Details | | | Concentrated Layer Details | |
|---|---|---|---|---|---|
| | Board Thickness (in) | Board Weight (lbs/MSF) | Nail Pull Result (lbs force) | Formulated Thickness (in) | Dry Density (pcf) |
| Board 8A | 0.5 | 1100 | 77.7 | 0.035 | 43.5 |
| Board 8B | 0.5 | 1114 | 82.3 | 0.035 | 39.6 |

This example shows a benefit of using a concentrated layer. Both boards demonstrated good nail pull with higher concentration of starch in the concentrated layer. Adding a higher concentration of pregelatinized starch in the concentrated layer resulted in better strength. As seen in Table 20, Board 8A demonstrated lower nail pull as compared with Board 8B. In this regard, Board 8A differed from Board 8B in that the concentrated layer of Board 8A was prepared using less pregelatinized starch, resulting in lower nail pull, while the concentrated layer slurry of Board 8B included more starch, resulting in higher nail pull. The results shown in Table 20 indicate starch concentration in the concentrated layer can be used to modify the nail pull result.

Example 9

This example illustrates a benefit of including a concentrated layer in gypsum board. Representative thickness of the concentrated layer for achieving improved nail pull is shown. Other thickness as described throughout herein can be used. Two boards were prepared, Boards 9A and 9B. Thickness was modified by increasing the speed of the application roller and narrowing the spread of the concentrated layer, thereby making it thicker. The compositions used in preparing 9A and 9B are set forth in Tables 21 and 22, respectively.

TABLE 21

Composition for Board 9A

| Ingredient | Core Weight (lbs/MSF) | Wt. % | Concentrated Layer Weight (lbs/MSF) | Wt. % |
|---|---|---|---|---|
| Stucco | 793 | 55% | 92.9 | 38.5% |
| Heat Resistant Accelerator | 20 | 1.40% | 1.5 | 0.62% |
| Foaming Agent | 0.95 | 0.07% | 0.048 | 0.02% |
| Pregelatinized Starch | 18 | 1.26% | 20 | 8.3% |
| Sodium Trimetaphosphate | 2.14 | 0.15% | 0.27 | 0.11% |
| Retarder | 0.48 | 0.03% | 0.025 | 0.01% |
| Dispersant | 2.4 | 0.17% | 0.09 | 0.04% |
| Alum | 0.8 | 0.06% | 0.052 | 0.02% |
| Glass fiber | 2 | 0.14% | 0.2 | 0.08% |
| Dextrose | 1.2 | 0.08% | 0.12 | 0.05% |
| Water | 591 | 41.27% | 126 | 52.2% |
| Total: | 1432 | 100% | 241 | 100% |

TABLE 22

Composition for Board 9B

| Ingredients | Core Weight (lbs/MSF) | Wt. % | Concentrated Layer Weight (lbs/MSF) | Wt. % |
|---|---|---|---|---|
| Stucco | 793 | 55% | 92.9 | 39% |
| Heat Resistant Accelerator | 20 | 1.40% | 1.5 | 0.62% |
| Foaming Agent | 0.95 | 0.07% | 0.048 | 0.02% |
| Pregelatinized Starch | 18 | 1.26% | 20 | 8.29% |
| Sodium Trimetaphosphate | 2.14 | 0.15% | 0.27 | 0.11% |
| Retarder | 0.48 | 0.03% | 0.025 | 0.01% |
| Dispersant | 2.4 | 0.17% | 0.09 | 0.04% |
| Alum | 0.8 | 0.06% | 0.052 | 0.02% |
| Glass Fiber | 2 | 0.14% | 0.2 | 0.08% |
| Dextrose | 1.2 | 0.08% | 0.12 | 0.05% |
| Water | 591 | 41.27% | 126 | 52% |
| Total: | 1432 | 100% | 241 | 100% |

Boards 9A and 9B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 9A and 9B with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final boards, 9A and 9B. Properties and dimensions of the boards are set forth in Table 23.

TABLE 23

Overall Board Details

| Board | Board Thickness (in) | Board Weight (lbs/MSF) | Nail Pull Result (lbs force) | Actual Thickness (pcf) |
|---|---|---|---|---|
| Board 9A | 0.5 | 1110 | 75.6 | 0.035 |
| Board 9B | 0.5 | 1109 | 80.2 | 0.04 |

This example shows a benefit of using a concentrated layer. Increasing the thickness of the concentrated layer enhanced strength, although both Boards 9A and 9B were sufficiently strong and effective. Both boards contained higher concentration of enhancing additive (starch) in the concentrated layer. As seen in Table 23, Board 9A demonstrated lower nail pull as compared with Board 9B. In this regard, Board 9A differed from Board 9B in that Board 9A was prepared using a lower speed on the application roller, resulting in a thinner concentrated layer, while Board 9B was prepared using a higher speed on the application roller, resulting in a thicker concentrated layer. The results shown in Table 23 indicate that increased starch concentration in the concentrated layer, as well as concentrated layer thickness can be used to modify nail pull results.

Example 10

This example demonstrates that the concentrated layer enhances nail pull performance at a board weight target of 1,100 lbs/MSF (about 5370 g/m$^2$). Two boards were prepared, Board 10A and Board 10B. Board 10B did not contain a concentrated layer, while Board 10A did. The slurry compositions for preparing Boards 10A and 10B are set forth in Tables 24 and 25, respectively. The compositions were prepared as described in Example 3.

TABLE 24

Composition for Board 10A

| | Core | | Concentrated Layer | |
|---|---|---|---|---|
| Ingredient | Weight (lbs/MSF) | Wt. % | Weight (lbs/MSF) | Wt. % |
| Stucco | 790 | 56% | 98 | 41.6% |
| Heat Resistant Accelerator | 17 | 1.20% | 2.7 | 1.15% |
| Foaming Agent | 0.88 | 0.06% | 0.044 | 0.02% |
| Pregelatinized Starch | 18 | 1.27% | 20 | 8.5% |
| Sodium Trimetaphosphate | 2.14 | 0.15% | 0.27 | 0.11% |
| Retarder | 0.48 | 0.03% | 0.03 | 0.01% |
| Dispersant | 2.2 | 0.15% | 0.09 | 0.04% |
| Alum | 0.8 | 0.06% | 0.052 | 0.02% |
| Glass fiber | 2 | 0.14% | 0.2 | 0.08% |
| Dextrose | 1.4 | 0.10% | 0.14 | 0.06% |
| Water | 585 | 41.20% | 114 | 48.4% |
| Total: | 1420 | 100% | 236 | 100% |

TABLE 25

Composition for Board 10B

| | Core | | Concentrated Layer | |
|---|---|---|---|---|
| Ingredients | Weight (lbs/MSF) | Wt. % | Weight (lbs/MSF) | Wt. % |
| Stucco | 817 | 53% | N/A | N/A |
| Heat Resistant Accelerator | 20 | 1.30% | N/A | N/A |
| Foaming Agent | 0.85 | 0.06% | N/A | N/A |
| Pregelatinized Starch | 20 | 1.30% | N/A | N/A |
| Sodium Trimetaphosphate | 2.14 | 0.14% | N/A | N/A |
| Retarder | 0.48 | 0.03% | N/A | N/A |
| Dispersant | 2 | 0.13% | N/A | N/A |
| Alum | 0.9 | 0.06% | N/A | N/A |
| Glass Fiber | 0 | 0.00% | N/A | N/A |
| Dextrose | 0 | 0.00% | N/A | N/A |
| Water | 678.1 | 43.99% | N/A | N/A |
| Total: | 1541 | 100% | N/A | N/A |

Boards 10A and 10B were each prepared on a high speed machine using a main pin mixer to combine wet and dry ingredients in a continuous process, as described in Example 3, to form a continuous ribbon of board precursor, with core slurry deposited between two sheets of paper. A concentrated layer was used to prepare Boards 10A with the aid of a secondary board mixer to blend wet and dry ingredients. This concentrated layer slurry was applied to the face paper using an application roller, with the core slurry deposited thereon from a discharge conduit from the main mixer. The precursors were processed and kiln dried to form the final boards, 10A and 10B. Properties and dimensions of the boards are set forth in Table 26.

TABLE 26

| | Overall Board Details | | | Concentrated Layer Details | |
|---|---|---|---|---|---|
| Board | Board Thickness (in) | Board Weight (lbs/MSF) | Nail Pull Result (lbs force) | Formulated Thickness (in) | Dry Density (pcf) |
| Board 10A | 0.5 | 1098 | 76.4 | 0.035 | 41 |
| Board 10B | 0.5 | 1096 | 70.2 | N/A | N/A |

This example shows a benefit of using a concentrated layer. As seen in Table 26, Board 10A demonstrated a higher nail pull as compared with Board 10B. In this regard, Board 10A differed from Board 10B in that Board 10A was prepared using a concentrated layer slurry that included higher concentrations of pregelatinized starch compared to the core slurry, resulting in higher nail pull, while Board 10B did not contain a concentrated layer. The results shown in Table 26 indicate a concentrated layer containing high concentrations of pregelatinized starch can be used to increase nail pull.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. As used herein, it will be understood that the term "bonding relation" does not necessarily mean that two layers are in immediate contact. The terms "comprising," "having," "including," and "containing" are to be construed as open-ended terms (i.e., meaning "including, but not limited to,") unless otherwise noted. Also, everywhere "comprising" (or its equivalent) is recited, the "comprising" is considered to incorporate "consisting essentially of" and "consisting of." Thus, an embodiment "comprising" (an) element(s) supports embodiments "consisting essentially of" and "consisting of" the recited element(s). Everywhere "consisting essentially of" is recited is considered to incorporate "consisting of." Thus, an embodiment "consisting essentially of" (an) element(s) supports embodiments "consisting of" the recited element(s). Recitation of ranges of values herein are merely intended to serve as a shorthand method of referring individually to each separate value falling within the range, unless otherwise indicated herein, and each separate value is incorporated into the specification as if it were individually recited herein. The term "exemplary" refers to an example and is not intended to suggest the best example. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making composite gypsum board, the method comprising:
  (a) preparing a first slurry comprising stucco, water and enhancing additive;
  (b) applying the first slurry in a bonding relation to a first cover sheet to form a concentrated layer, the concentrated layer having a first face and a second face, wherein the first concentrated layer face faces the first cover sheet;
  (c) mixing at least water, stucco, and optionally the enhancing additive to form a second slurry;
  (d) applying the second slurry in a bonding relation to the concentrated layer to form a board core having a first face and a second face, the first face of the board core facing the second face of the concentrated layer;
  (e) applying a second cover sheet in bonding relation to the second board core face to form a board precursor; and
  (f) drying the board precursor to form the composite gypsum board; wherein:
    i. when the second slurry contains the enhancing additive, the enhancing additive is more concentrated in the first slurry than the second slurry,
    ii. when dried, the board core has a dry thickness that is about 5 to about 35 times greater than the dry thickness of the concentrated layer,
    iii. the board has a nail pull resistance according to ASTM C473-10, Method B of at least 68 lbs of force,
    iv. the board has a dry density of about 33 pcf (about 530 kg/m$^3$) or less, and
    v. the enhancing additive includes starch.

2. The method of claim 1, wherein, when dried, the concentrated layer has a density of at least about 1.1 times higher than a density of the board core.

3. The method of claim 2, wherein a density differential between the concentrated layer and the board core is at least about 8 pcf (about 130 kg/m$^3$).

4. The method of claim 1, wherein the board has a nail pull resistance according to ASTM C473-10, Method B of at least about 77 lbs of force.

5. The method of claim 1, wherein the first slurry is mixed in a first mixer and the second slurry is mixed in a second mixer.

6. The method of claim 1, wherein the starch comprises a pregelatinized starch having a viscosity of from about 20 centipoise to about 700 centipoise when the viscosity is measured while the starch is subjected to conditions according to the VMA method.

7. The method of claim 1, wherein, when dried, the concentrated layer has a thickness of from about 0.02 inches (about 0.05 cm) to about 0.09 inches (about 0.23 cm).

8. The method of claim 1, wherein first slurry contains at least about 6 times the enhancing additive contained in the second slurry.

9. The method of claim 1, wherein, when dried, the concentrated layer has an average core hardness that is at least about 1.5 times greater than the average core hardness of the board core.

10. The method of claim 1, wherein the first slurry further comprises glass fiber.

11. The method of claim 1, wherein the starch comprises a pregelatinized starch having a viscosity of from about 20 centipoise to about 700 centipoise when the viscosity is measured while the starch is subjected to conditions according to the VMA method.

12. The method of claim 1, wherein the board core forms 90% or more of the bulk volume of the board.

13. The method of claim 1, wherein the enhancing additive further includes one or more of polyvinyl alcohol, boric acid, gypsum-cement, nano-cellulose and micro-cellulose.

14. A method of making composite gypsum board, the method comprising:
  (a) mixing at least water, stucco and enhancing additive to form a first slurry having a water-stucco ratio of from about 0.7 to about 2;
  (b) applying the first slurry in a bonding relation to a first cover sheet to form a concentrated layer having a first face and a second face;

(c) mixing at least water, stucco, and optionally the enhancing additive to form a second slurry having a water-stucco ratio of from about 0.3 to about 1.1;

(d) applying the second slurry in a bonding relation to the concentrated layer to form a board core having a first density, the board core having a first face and a second face, wherein the first face of the board core faces the first face of the concentrated layer and the second face of the concentrated layer faces the first cover sheet;

(e) applying a second cover sheet in bonding relation to the second face of the board core to form the composite gypsum board: and (f) drying the board; wherein:
  i. when the second slurry contains the enhancing additive, the enhancing additive is more concentrated in the first slurry than the second slurry,
  ii. when dried the board core has a dry thickness that is about 5 to about 35 times greater than the dry thickness of the concentrated layer, and
  iii. the board has a hail pull resistance according to ASTM C473-10, Method B of at least about 68 lbs of force,
  iv. the board has a dry density of about 33 pcf (about 530 kg/m$^3$) or less, and
  v. the enhancing additive includes starch.

15. The method of claim 14, wherein, when dried, the concentrated layer has a density of at least about 1.1 times higher than a density of the board core.

16. The method of claim 14, wherein, when dried, the concentrated layer has a thickness of from about 0.02 inches (about 0.05 cm) to about 0.09 inches (about 0.23 cm).

17. The method of claim 14, wherein the first slurry is mixed in a first mixer and the second slurry is mixed in a second mixer.

18. The method of claim 14, wherein the second mixer has a higher mixing volume capacity than the first mixer.

19. The method of claim 14, further comprising applying a bonding layer between the second cover sheet and the board core.

20. The method of claim 14, wherein the board a nail pull resistance of at least about 77 lbs of force according to ASTM C473-10, Method B.

21. The method of claim 14, wherein, when dried, the concentrated layer has an average core hardness that is at least about 1.5 times greater than the average core hardness of the board core.

22. The method of claim 14, wherein the board core forms 90% or more of the bulk volume of the board.

23. The method of claim 14, wherein the enhancing additive further includes one or more of polyvinyl alcohol, boric acid, gypsum-cement, nano-cellulose and micro-cellulose.

* * * * *